(12) United States Patent
Watanabe et al.

(10) Patent No.: US 8,492,004 B2
(45) Date of Patent: Jul. 23, 2013

(54) FRICTION-JOINING STRUCTURE

(75) Inventors: Atsushi Watanabe, Tokyo (JP); Atsushi Tomimoto, Tokyo (JP)

(73) Assignees: Nippon Steel Engineering Co., Ltd., Tokyo (JP); Nippon Steel & Sumitomo Metal Corporation, Tokyo (JP)

(*) Notice: Subject to any disclaimer, the term of this patent is extended or adjusted under 35 U.S.C. 154(b) by 0 days.

(21) Appl. No.: 13/313,646

(22) Filed: Dec. 7, 2011

(65) Prior Publication Data

US 2012/0183801 A1    Jul. 19, 2012

Related U.S. Application Data

(62) Division of application No. 12/226,178, filed as application No. PCT/JP2007/058228 on Apr. 10, 2008, now abandoned.

(30) Foreign Application Priority Data

Apr. 10, 2006 (JP) ................. 2006-107457
Feb. 28, 2007 (JP) ................. 2007-049013

(51) Int. Cl.
*B32B 15/00* (2006.01)
*B32B 15/04* (2006.01)
*B32B 15/18* (2006.01)
*B32B 7/02* (2006.01)

(52) U.S. Cl.
USPC ........... 428/609; 428/683; 428/212; 428/217; 428/596

(58) Field of Classification Search
USPC ................. 428/687, 681, 682, 683, 684, 685, 428/686, 212, 220, 217, 653, 596, 597, 573, 428/629, 332, 609
See application file for complete search history.

(56) References Cited

FOREIGN PATENT DOCUMENTS

| JP | 5-248010 | 9/1993 |
|----|----------|--------|
| JP | 6-330566 | 11/1994 |
| JP | 7-173878 | 7/1995 |
| JP | 11-106867 | 4/1999 |
| JP | 11-106878 | 4/1999 |
| JP | 11-247831 | 9/1999 |
| JP | 2002-155910 | 5/2002 |
| JP | 2003-28128 | 1/2003 |
| JP | 2003-214409 | 7/2003 |

OTHER PUBLICATIONS

Machine Translation, Watanabe, JP 2003-214409, Jul. 2003.*
Machine Translation, Tokuno, JP 11-106867, Apr. 1999.*
International Search Report and Written Opinion dated Jun. 19, 2007 issued in corresponding PCT Application No. PCT/JP2007/058228.

* cited by examiner

*Primary Examiner* — Michael La Villa
(74) *Attorney, Agent, or Firm* — Kenyon & Kenyon LLP

(57) ABSTRACT

The invention provides a friction joining structure comprising steel products, a friction joining steel plate inserted there between, and a fastening device, which are mutually friction joined by a compressive force derived from the fastening device. A portion of projected streaks on the friction joining steel plate is designed to have a Vickers hardness at least 3 times greater than the surface of the steel products, which allows the projected streaks to more easily enter the steel products thereby increasing the friction coefficient between the steel products. The friction joining structure is constituted by a slip resistance mechanism which can be easily validated from a theoretical or an experimental point of view and is also small in variance of the friction coefficient. Therefore, a friction coefficient used in design can be set at a high value with high accuracy to realize a rational design.

13 Claims, 24 Drawing Sheets

FRICTION-JOINING STRUCTURE

This application is a divisional application under 35 U.S.C. §120 and §121 of prior application Ser. No. 12/226,178 filed Oct. 8, 2008 now abandoned which is a 35 U.S.C. §371 of PCT/JP2007/058228 filed Apr. 10, 2007, which claims priority to Japanese Patent Application No. 2006-107457, filed Apr. 10, 2006, and Japanese Patent Application No. 2007-49013, filed Feb. 28, 2007, the content of each of which is incorporated herein by reference.

TECHNICAL FIELD

The present invention relates to a friction-joining steel plate and a friction-joining structure, and more particularly to a friction-joining steel plate inserted between steel products to be joined which are mutually friction-joined and a friction-joining structure in which the friction-joining steel plate is used.

BACKGROUND ART

Conventionally, in the fields of architecture and civil engineering, friction joining is generally conducted in which fastening devices such as high-strength bolts are used to fasten steel products to be joined, which are then mutually joined by utilizing a frictional resistance resulting from the compressive force derived from the fastening devices, thereby providing a joining structure for steel products constituting a framework of steel structures (buildings, bridges and the like). In general friction joining, steel products to be joined such as base materials (columns, beams, braces and the like) or joining members (splice plates, gusset plates, and the like) are processed to form the friction surface by the following methods to secure a friction coefficient. That is, sanding or grinding is applied to remove black scale from the steel products, which are then allowed to stand to develop red rust, or shot blasting is applied to make the friction surface rough. However, these methods only generate a relatively small friction coefficient on the friction surface and also have difficulty in securing a stable frictional resistance. Thereby, there is no choice but to adopt a lower value, with consideration given to safety in design, making it difficult to provide a rational design. Under these circumstances, it has been long desired to solve the above difficulty.

Meanwhile, it is known that a pair of joining faces which are in contact with each other for steel products to be joined are processed so that they are mutually different in hardness and roughness as a structure for increasing a frictional resistance between steel products to be joined by friction joining (refer to Japanese Published Unexamined Patent Application No. 2002-155910, for example). The friction-joining structure described in Patent Document 1 is such that one of the joining faces is subjected to one-time shot blasting and the other joining face is subjected to two-time shot blasting, by which the joining faces are made into friction surfaces different in hardness and roughness, thereby increasing the friction coefficient between the friction surfaces and reducing the number of bolts or making the diameter small, and realizing a rational design.

However, in a conventional friction-joining structure described in the above-described Patent Document 1, since joining faces of steel products to be joined are subjected to one-time or multiple-time shot blasting to form a friction surface, it is necessary to process many steel products to be joined which are available in a wide variety, thus resulting in an increase in labor and time and raising the processing cost, which poses a problem. Further, even if a method including shot blasting is used to make different the hardness and the roughness of a friction surface to raise friction coefficients of the friction surface, there still remains a wide variance in the thus obtained friction coefficients. Consequently, there is not a substantial improvement in the upper limit of the friction coefficients available in design as expected, thus, resulting in a smaller cost-effectiveness, which poses another problem.

An object of the present invention is to provide a friction-joining steel plate and a friction-joining structure, which are applicable to a wide variety of friction joining portions at a low cost and also able to raise frictional resistance reliably, thereby realizing a rational design.

DISCLOSURE OF INVENTION

The friction-joining steel plate described in a first aspect of the present invention is a friction-joining steel plate inserted between steel products to be joined which are mutually friction-joined by a compressive force derived from a fastening device, the friction-joining steel plate being provided on both faces with a plurality of projected streaks continuously formed mutually parallel or mutually concentric and also provided with at least one insertion hole for allowing the fastening device to be inserted, wherein a portion of the projected streaks is designed to be higher in Vickers hardness than the surface of the steel products to be joined.

In a friction-joining steel plate of the present invention, it may be arranged such that a portion of the projected streaks be set to be at least 3 times greater in Vickers hardness than the surface of the steel products to be joined.

Vickers hardness is the hardness of a metal material measured in accordance with a test method (JIS Z 2244) of the Japanese Industrial Standards (JIS) or a test method (ISO 6507-1) as specified by the International Organization for Standardization (ISO), in this instance, meaning the respective surface harnesses of a steel product to be joined and a friction-joining steel plate. That is, where Vickers hardness at a portion of projected streaks on the friction-joining steel plate is given as $H_{vh}$ and that on the surface of the steel product to be joined is given as $H_{vm}$, it may be arranged such that the steel product to be joined and the friction-joining steel plate be set respectively for the surface hardness so that a hardness ratio $r_h$ ($=H_{vh}/H_m$) can satisfy the following formula (1).

$$r_h \geq 3 \qquad (1)$$

According to the above-described present invention, since the portion of projected streaks on the friction-joining steel plate is set to be harder than the surface of the steel products to be joined (preferably, at least three times higher in hardness), the projected streaks on the friction-joining steel plate can enter more easily into the steel products to be joined, and a frictional resistance resulting from mechanical slip resistance of the thus entered friction-joining steel plate acts between the steel products to be joined, thereby, making it possible to increase remarkably a friction coefficient between the steel products to be joined via the friction-joining steel plate. As a result, a friction-joining structure is constituted by a slip resistance mechanism which can be easily validated from a theoretical or an experimental point of view and is also small in variance of friction coefficient. It is, therefore, possible to set a friction coefficient in design to be a high value with accuracy and also realize a rational design. In other words, the friction coefficient can be set higher than in a conventional case to reduce the number of bolts or miniaturize the diameter thereof, thus making it possible to keep the partial loss of area of a base material to a minimum extent.

Further, by making a splice plate and a gusset plate smaller, it is possible to reduce the quantity of steel products and also reduce material/construction costs necessary for architectural structures and civil engineering construction.

Further, the present invention eliminates the necessity for applying a conventional shot blasting to the surface of a steel product to be joined, or for removing black scale or generating red rust, thus making it possible to process the steel product to be joined at reduced labor and time and also to drastically reduce the production cost. Still further, the prevent invention also eliminates the necessity for processing many steel products to be joined which are available in a wide variety. In other words, a friction-joining steel plate with a predetermined size and a predetermined form is used in handling these steel products to be joined, or the friction-joining steel plate is only inserted between the steel products to be joined, thereby providing a high friction coefficient as described above. It is, therefore, possible to mass-produce the friction-joining steel plate and also to reduce the production and construction costs more effectively.

In this instance, a friction-joining steel plate of the present invention is preferred to have a tip angle (θ) of the projected streak ranging from 50° to 100°.

In other words, the projected streaks on the friction-joining steel plate are formed in such a way that the tip angle θ of the projected streaks can satisfy the following formula (2).

$$50° \leq \theta \leq 100° \quad (2)$$

The above-described constitution allows the tip angle θ of the projected streaks to be set in a range from 50° to 100°, that is, the projected streaks can be formed so as to give an angle not excessively acute and which can easily enter into a steel product to be joined, thereby making it possible to secure a shearing strength at a portion of the projected streaks and also exhibit a mechanical slip resistance to a sufficient extent. Further, it may be arranged such that the tip angle θ of the projected streaks be set to 75° or more and 90° or less ($75° \leq \theta \leq 90°$).

Further, a friction-joining steel plate of the present invention is preferred to have a stress intensity ratio ($\sigma/\sigma_{mb}$) which is set to be 0.5 or less. This stress intensity ratio ($\sigma/\sigma_{mb}$) is obtained by dividing a compressive stress (σ) acting on the steel product to be joined due to a compressive force of the fastening device by a tensile strength ($\sigma_{mb}$) of the steel product to be joined.

In this instance, the compressive stress (σ) acting on the steel product to be joined is a stress intensity obtained by dividing a compressive force (N) resulting from fastening devices such as high strength bolts by a total length dimension (L) of the projected streaks on the friction-joining steel plate and a width dimension (B) of a recess formed by the steel product to be joined which sinks when the projected streaks enter into the surface of the steel product to be joined. That is, it means a stress intensity expressed by the relationship of $\sigma = N/(L \cdot B)$. Therefore, a material type of the steel product to be joined, a dimension of the friction-joining steel plate and a form of the projected streaks are established in such away that a ratio of the compressive stress σ acting on the steel product to be joined to the tensile strength $\sigma_{mb}$ can satisfy the following formula (3).

$$\sigma/\sigma_{mb} \leq 0.5 \quad (3)$$

According to the above-described constitution, the compressive stress σ acting on the steel product to be joined is set to be less than half the tensile strength $\sigma_{mb}$. In other words, a dimension of the friction-joining steel plate as well as the number and the length of the projected streaks are established appropriately, depending on the type of steel products to be joined (tensile strength $\sigma_{mb}$) and the type of bolts to be used, thus making it possible to secure the shearing strength and the turn-over strength of steel products to be joined and also exhibit mechanical slip resistance to a sufficient extent.

As described so far, a friction-joining steel plate of the present invention may be constituted so as to satisfy all the formulae (1), (2) and (3) at the same time. However, it may be constituted so as to satisfy at least two of these formulae (1) to (3), and it may be also constituted so as to satisfy at least only any one of these formulae (1) to (3).

More specifically, after earnest research, the applicant of the present invention has found that three elements (parameters), that is, a hardness ratio $r_h$, expressed by the formula (1), a tip angle θ, of projected streaks expressed by the formula (2) and a stress intensity ratio $\sigma/\sigma_{mb}$, expressed by the formula (3) have a great effect in determining a friction coefficient of the friction-joining steel plate, and an appropriate arrangement of these three elements can provide a large friction coefficient (for example, a friction coefficient of 0.9 or greater).

Then, where SS400 or SS490, i.e. a rolled steel product for general use (JIS G 3101) having a tensile strength from 400 to 500 (N/mm$^2$), or SM400 or SM490, i.e. a rolled steel product for a welded structure (JIS G 3106), is used as a steel product to be joined, it may be arranged such that a friction-joining steel plate is formed with S45C, S48C, S50C or S53C, i.e. a carbon steel for machine structural use (JIS G 4051) having a tensile strength greater than 450 (N/mm$^2$) or a steel product similar in Vickers hardness.

Further, a friction-joining steel plate of the present invention may be set for a space (S) between the projected streaks to range from 0.8 mm to 2.0 mm.

Still further the friction-joining steel plate of the present invention may be set for a radius ($R_1$) of the tip end portion of the projected streak to be 0.1 mm or less.

Then, the friction-joining steel plate of the present invention may be set for a radius ($R_2$) of the recess between the projected streaks to be 0.4 mm or greater.

According to the above-described constitution, a space (S) between projected streaks can be set in a range from 0.8 mm to 2.0 mm, thus making it possible to form many projected streaks on both faces of a friction-joining steel plate having a predetermined dimension. Further, a radius ($R_1$) of the tip end portion of the projected streak is set to be 0.1 mm or less, thus making it possible to secure an acute angle of the projected streak which can easily enter into the steel product to be joined and also obtain a high friction coefficient. Still further, a radius ($R_2$) of the recess between the projected streaks is set to be 0.4 mm or greater, by which the recess, which is a base of the projected streak, can be increased in strength, preventing the projected streak from being broken due to shearing on being subject to a frictional resistance, thereby providing a stable friction coefficient.

Further, in the friction-joining steel plate of the present invention, a width dimension (B) of a part at which the projected streaks enter into the surface of the steel product to be joined may be set to be about ⅓ of the space (S) between the projected streaks.

According to the above-described constitution, the steel product to be joined and the friction-joining steel plate are appropriately set for the strength and the hardness in such a way that the width dimension (B) of a part at which the projected streaks enter thereinto is equal to ⅓ of the space (S) between the projected streaks, thus making it possible to secure an extent to which the projected streaks can enter and to increase a friction coefficient. Further, a width dimension of a part at which the projected streaks do not enter into the surface of the steel product to be joined is secured, thereby making it possible to prevent the steel product to be joined from being deformed or broken due to shearing and also to exhibit a stable frictional resistance.

Further, the friction-joining steel plate of the present invention may be formed in a planar shape including a circle centering at the shaft of the fastening device, and the diameter of the friction-joining steel plate is 2.5 times the shaft diameter of the fastening device.

According to the above-described constitution, since the friction-joining steel plate is provided with a dimension including an area encircled by the circle, the diameter of which is 2.5 times the shaft diameter of the fastening device, a compressive force derived from the fastening device is allowed to act uniformly on the friction-joining steel plate covered by the area, thus making it possible to obtain a stable friction coefficient.

Further, the friction-joining steel plate of the present invention may be set for a distance (H) between the tip end of the projected streak on one surface of the friction-joining steel plate and the tip end of the projected streak on the other surface of the friction-joining steel plate to range from 1.5 mm to 2.5 mm.

According to the above-described constitution, since the distance (H) between the tip ends of the projected streaks, or a thickness dimension of the friction-joining steel plate, is set in a range from 1.5 mm to 2.5 mm, a compressive force derived from the fastening device is used to bend the friction-joining steel plate, which can be then firmly attached to the surface of the steel product to be joined. Thus, all the projected streaks on the friction-joining steel plate are allowed to enter accurately into the steel products to be joined, thus making it possible to obtain a high friction coefficient.

Further, in the friction-joining steel plate of the present invention, the projected streaks may be formed by any processing method such as rolling, cutting or casting.

In the friction-joining steel plate of the present invention, the friction-joining steel plate may be quenched after formation of the projected streaks.

According to the above-described constitution, the projected streaks can be formed by any processing method such as rolling, cutting or casting, and any desired processing method can be selected according to a quantity or types of steel products to manufacture a friction-joining steel plate, thereby making it possible to reduce the production cost. Further, since quenching is conducted after formation of the projected streaks, it is possible to increase and stabilize the hardness at a portion of projected streaks.

Further, the friction-joining steel plate of the present invention may be tacked to one of the steel products to be joined by using tack tape or applying rust preventive paint.

Still further, in the friction-joining steel plate of the present invention, the tack tape is aluminum tape adhered on one of the steel products to be joined so as to cover the friction-joining steel plate, and when one and the other of the steel products to be joined are fastened by using the fastening device in a state that a face covered by the aluminum tape is kept in contact with the other of the steel product to be joined, projected streaks on the side of the other of the steel product to be joined break the aluminum tape, thereby entering into the other of the steel product to be joined, and projected streaks on the side of one of the steel products to be joined enter into one of the steel products to be joined.

According to the above-described constitution, the friction-joining steel plate is tacked in advance to one of the steel products to be joined due to the adhesive force of tack tape or rust preventive paint. That is, a friction-joining steel plate is tacked not at an elevated place on a construction site but at a place where the steel plate can be easily managed such as in a plant or at a temporary stockyard on the ground, thus making it possible to arrange the friction-joining steel plate under such managed conditions that projected streaks are appropriately determined for the orientation, the arrangement position, the number and the like. Then, where tack tape (for example, aluminum tape) or rust preventive paint is used to cover and tack the friction-joining steel plate, steel products to be joined are fastened by the fastening device, by which the tack tape or the like is broken at a portion of projected streaks on the friction-joining steel plate, the projected streaks are projected to enter into the steel product to be joined, thus making it possible to obtain a high friction coefficient as described above.

Further, the friction-joining steel plate of the present invention may be provided with a plurality of insertion holes for allowing the shaft of the fastening device to pass through, in which a recess between the projected streaks at an intermediate position between the insertion holes is formed deeper than a recess at other positions.

According to the above-described constitution, the recess at an intermediate position between the insertion holes is made deeper, thus making it possible to break into divisions the friction-joining steel plate concerned at the position of this recess, whenever necessary. In this instance, for example, the recess may be formed deep enough so that the friction-joining steel plate can be broken by hand or may be formed deep enough so that it can be broken by an appropriate tool. As described above, the friction-joining steel plate is made so as to be broken at an intermediate position between insertion holes, by which the friction-joining steel plate can be broken into divisions, even where a hole pitch of a fastening device formed on the steel product to be joined (bolt pitch) does not coincide with a pitch of the insertion hole of the friction-joining steel plate, and the steel plate can be arranged so as to coincide with a hole pitch of the steel product to be joined. Further, if the hole pitch of the steel product to be joined coincides with the pitch of the insertion hole of the friction-joining steel plate, the friction-joining steel plate may be arranged as it is, without being broken into divisions.

Further, the friction-joining structure of the present invention is a friction-joining structure in which either of the friction-joining steel plates is inserted between steel products to be joined, and black scale or red rust is formed on the surface of the steel products to be joined, or abrasive blasting, sanding or rust preventive painting is applied thereto.

According to the above present invention, the previously described effect of the friction-joining steel plate can be provided, that is, a friction coefficient used in design can be set higher with high accuracy to realize a rational design. Further, the number of bolts can be reduced or a splice plate and the like can be made small, thereby material/construction costs can be effectively reduced. Further, where black scale or rust preventive painting is applied to the surface of a steel product to be joined, projected streaks on the friction-joining steel plate are allowed to enter into the steel products to be joined penetrating the black scale or the rust preventive painting, thus making it possible to provide a stable friction coefficient, irrespective of the surface state of the steel products to be joined. Still further, since the present invention eliminates the necessity of removing the black scale or the rust preventive paint, a touch-up painting for rust prevention after joining is not necessary, and also contributes to a reduction in labor and time related to construction work.

Further, in the friction-joining structure of the present invention, it may be arranged such that two or more of the friction-joining steel plates be superimposed and inserted between the steel products to be joined.

According to the above-described constitution, where there is a difference in thickness dimension between the steel products to be joined, the friction-joining steel plates are appropriately adjusted for the number, depending on the difference, and inserted between the steel products to be joined, thus making it possible to cope with various combinations of the steel products to be joined. The present invention also eliminates the necessity for providing friction-joining steel plates with various thickness dimensions, thereby making it possible to reduce material/construction costs. Then, even if the friction-joining steel plates to be superimposed are not joined by welding or the like, the projected streaks formed both of the steel plates are mated to each other, so as not to deviate toward the shearing direction and to transmit a frictional resistance appropriately.

The above-described friction-joining steel plate and the friction-joining structure of the present invention are applicable to various friction joining portions at low cost and also able to reliably increase frictional resistance, thereby realizing a rational design.

BEST MODES FOR CARRYING OUT THE INVENTION

Figure 1:
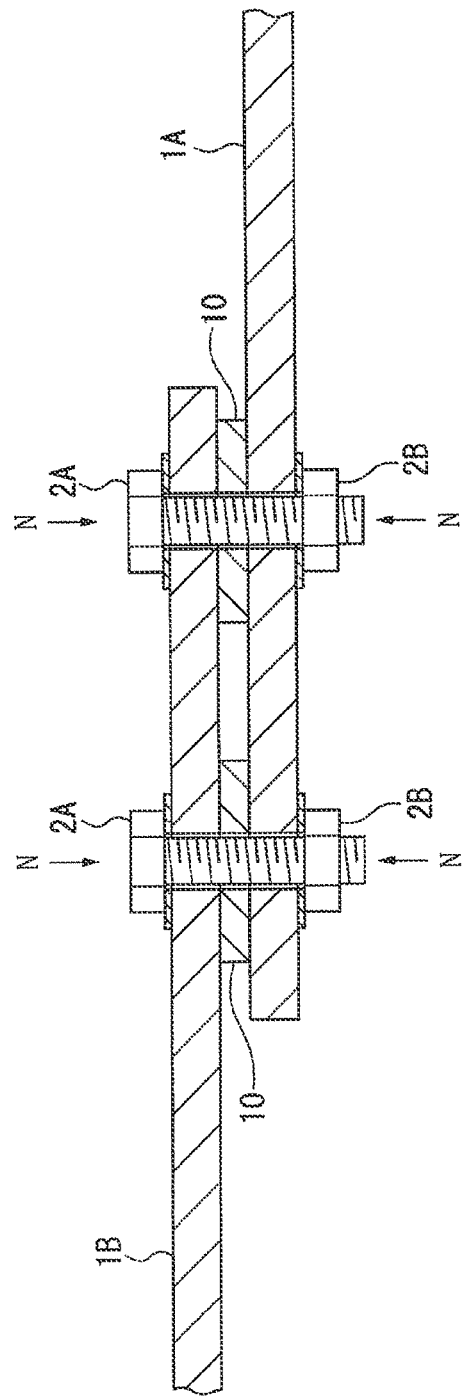
FIG. 1 is a sectional view showing a friction-joining structure of an embodiment in the present invention.

Hereinafter, a description will be made of embodiments of the present invention by referring to the drawings.

Figure 2A:
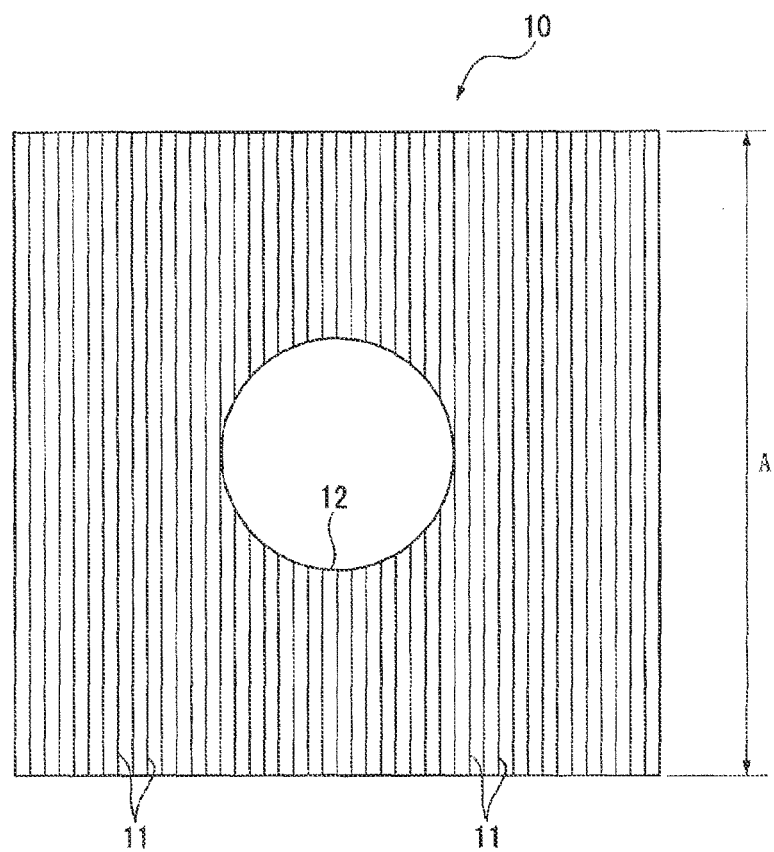
FIGS. 2(A) and (B) are respectively a front view and a sectional view showing a friction-joining steel plate used in the friction-joining structure.
Figure 2B:
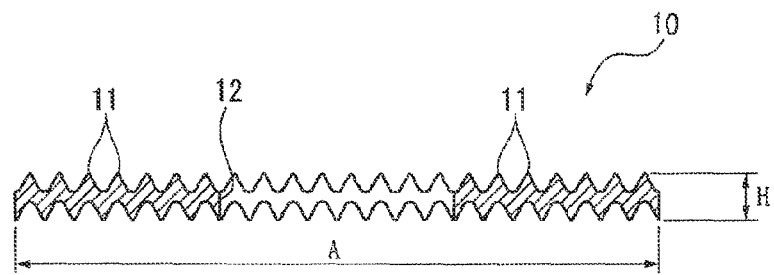
Figure 3:
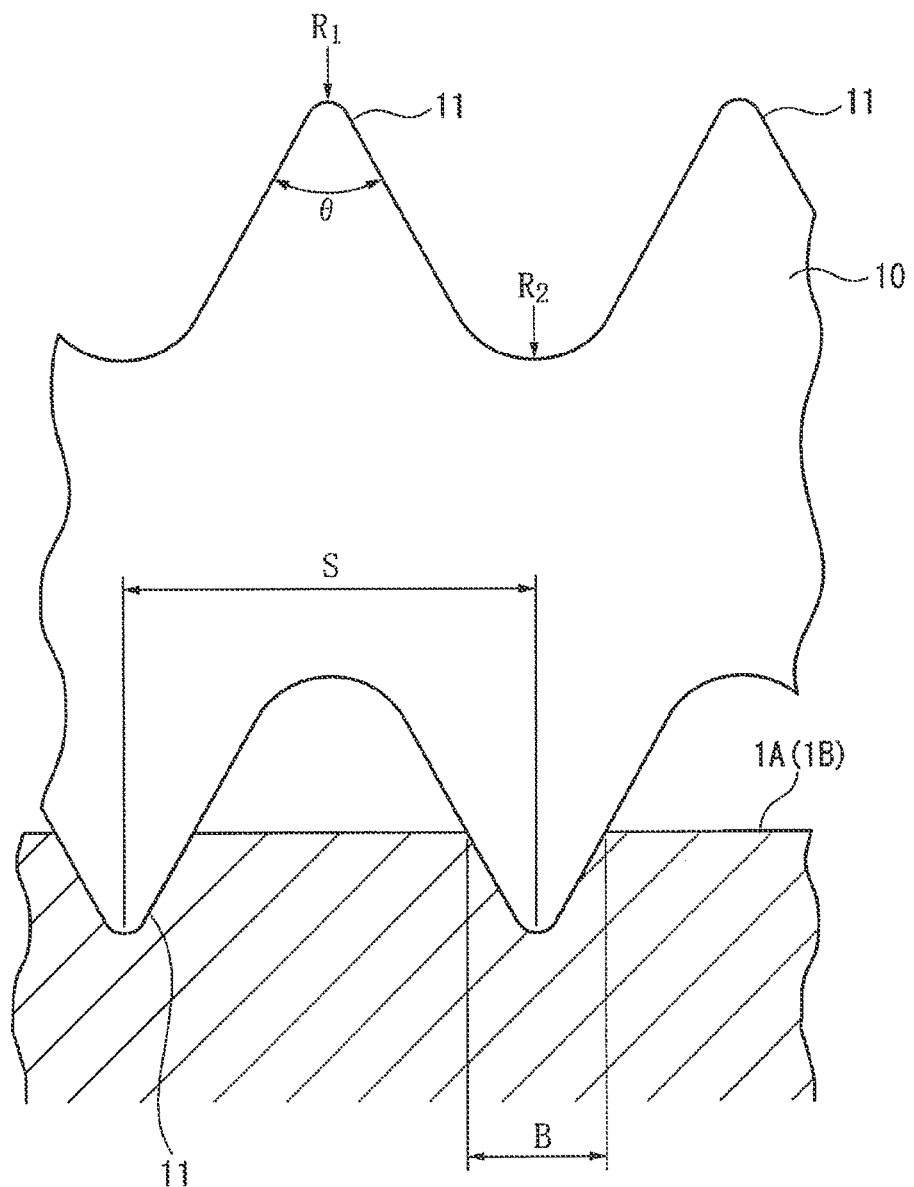
FIG. 3 is an enlarged sectional view showing major parts of the friction-joining structure.

FIG. 1 is a sectional view illustrating a friction-joining structure of the present invention. FIG. 2(A) and FIG. 2(B) are respectively a front view and a sectional view illustrating a friction-joining steel plate 10 used in the friction-joining structure. FIG. 3 is an enlarged sectional view illustrating important parts of the friction-joining structure.

In FIG. 1 to FIG. 3, the friction-joining structure of the present invention is such that a pair of steel plates 1A and 1B, which are steel products to be joined, are fastened by a plurality of high strength bolts 2A and nuts 2B, that is, fastening devices, thereby the steel plates 1A and 1B are friction-joined by a compressive force derived from these fastening devices, and a friction-joining steel plate 10 is inserted between the steel plates 1A and 1B, corresponding to each of the high strength bolts 2A.

In this instance, the pair of steel plates 1A and 1B may include a case where the steel plate 1A is a flange or a web of section steel (H section steel, etc.) constituting a frame of a structure, while the steel plate 1B is a splice plate (fish plate) or a gusset plate, and a case where both of the steel plates 1A and 1B are a part of section steel or a steel plate itself. Then, the steel products to be joined include rolled steel products for general use and rolled steel products for a welded structure, which are formed by using SS400, SS490, SM400, SM490 and the like having a tensile strength from appropriately 400 to 500 (N/mm$^2$). Further, the high strength bolts 2A and nuts 2B include those which can be fastened to the direction at which a pair of the steel plates 1A and 1B approach each other at a predetermined compressive force (bolt axial tension) N and which are available in any given fastening manner.

As illustrated in FIG. 2, a friction-joining steel plate 10 is provided on both faces with a plurality of projected streaks 11 which are generally in a thin plate shape and continuously formed in parallel and also provided with one insertion hole 12 for allowing the high strength bolt 2A to pass through. The friction-joining steel plate 10 is formed with S45C, a carbon steel product for machine construction having a tensile strength greater than 450 (N/mm$^2$) or the like, and the planar shape is to be of a dimension including a circle around the shaft of the high strength bolt 2A (at the center of the insertion hole 12), the diameter of which is 2.5 times the shaft diameter ($\phi$) of the high strength bolt 2A, in other words, an approximately square shape having the length of one side of A (A≧2.5$\phi$). Further, a distance (H) between the tip ends of the projected streaks on both faces, which is a thickness dimension of the friction-joining steel plate 10, is set to be about 2.0 mm, and the projected streaks 11 are arranged so as to be orthogonal to a stretching direction of the steel plates 1A and 1B (the lateral direction in FIG. 1).

The projected streaks 11 on the friction-joining steel plate 10 are formed by cold or hot rolling. Further, quenching is conducted after formation of the projected streaks 11, by which Vickers hardness ($H_{vh}$) at a portion of the projected streaks 11 is set to be more than 3 times greater than the Vickers hardness ($H_{vm}$) on the surface of the steel plates 1A and 1B. That is, the Vickers hardness ratio of the projected streaks 11 on the friction-joining steel plate 10 to the surface of the steel plates 1A and 1B ($r_h = H_{vh}/H_{vm}$) is set so as to give $r_h \geq 3$. According to the above-described friction-joining steel plate 10, the projected streaks 11 are allowed to enter into the surface of the steel plates 1A and 1B due to a compressive force derived from the high strength bolts 2A (N, refer to FIG. 1), thereby providing a high frictional resistance between the steel plates 1A and 1B. It is to be noted that the projected streaks 11 are not restricted to those formed by rolling but may include those formed by cutting or casting.

Next, a description will be made of a detailed structure of the friction-joining steel plate 10 by referring to FIG. 3.

The projected streaks 11 on the friction-joining steel plate 10 are those in which a space (S) between adjacent projected streaks 11 is set to be about 1.0 mm and a tip angle ($\theta$) of the projected streak 11 is set in a range from 50° to 100°. Further, a radius ($R_1$) of the tip end portion of the projected streak 11 is set to be 0.1 mm or less and a radius ($R_2$) of the recess between the projected streaks 11 is set to be 0.4 mm or greater. Still further, regarding the extent to which the projected streaks 11 enter into the steel plates 1A and 1B, a width dimension (B) of a part at which they enter is set to be about ⅓ of the space (S) between the projected streaks 11.

Further, a compressive stress ($\sigma$) acting on the steel plates 1A and 1B due to the compressive force (N) on tightening the high strength bolts 2A is set to be 0.5 or less with respect to the tensile strength ($\sigma_{mb}$) of the steel plates 1A and 1B, that is, stress intensity ratio $\sigma/\sigma_{mb} \leq 0.5$. In this instance, the compressive stress ($\sigma$) acting on the steel plates 1A and 1B means a stress intensity $\sigma = N—(L \cdot B)$ obtained by dividing a compressive force (N) of the high strength bolt 2A by a total length dimension ($L = \Sigma A$) of the projected streaks 11 on the friction-joining steel plate 10 and a width dimension (B) of a part at which the projected streaks 11 enter.

In the above-described friction-joining structure, such an operation procedure can be applicable such that before the steel plates 1A and 1B are fastened by using high strength bolts 2A and nuts 2B at a construction site, the friction-joining steel plate 10 is temporarily tacked at a predetermined position on the steel plate 1A or the steel plate 1B by using adhesive tape, adhesive agent and the like. Even where the friction-joining steel plate 10 is tacked as described above, the high strength bolts 2A are used to fasten the steel plates 1A and 1B, by which the projected streaks 11 on the friction-joining steel plate 10 can penetrate through the adhesive tape or the adhesive agent to enter into the surface of the steel plates 1A and 1B.

Further, black scale or red rust is formed on the entire surface of the steel plates 1A and 1B, alternatively, to which abrasive blasting, sanding or rust preventive painting is applied. As described above, even if the black scale is formed or rust preventive paint is applied to the entire surface of the steel plates 1A and 1B, that is, at a position as well where the friction-joining steel plate 10 is arranged, the high strength bolts 2A are used to fasten the steel plates 1A and 1B, by which the projected streaks 11 on the friction-joining steel plate 10 can penetrate through the black scale or the rust preventive painting to enter into the surface of the steel plates 1A and 1B.

Further, the friction-joining steel plate may include not only the friction-joining steel plate 10 formed in an approximately square shape but also those available in various forms as illustrated below in FIG. 4(A) to FIG. 6.

FIG. 4(A), FIG. 4(B) and FIG. 5(A), FIG. 5(B) are respectively front views and sectional views illustrating friction-joining steel plates 10A and 10B related to a modification example of the present embodiment. FIG. 6 is a front view illustrating a friction-joining steel plate 10C related to a modification example of the present embodiment.

Figure 4A:
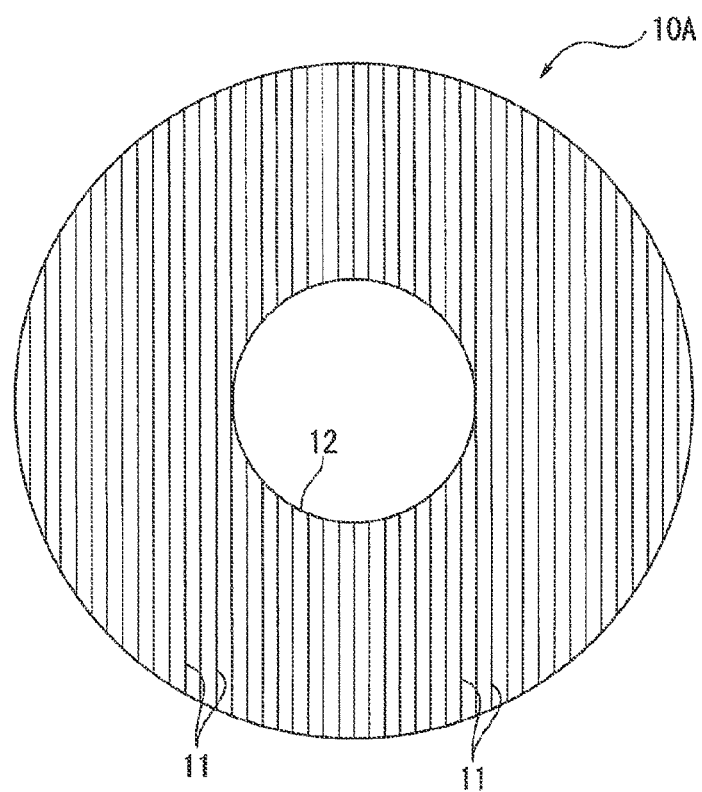
FIGS. 4(A) and (B) are respectively a front view and a sectional view showing a friction-joining steel plate of a modification example in the embodiment.
Figure 4B:
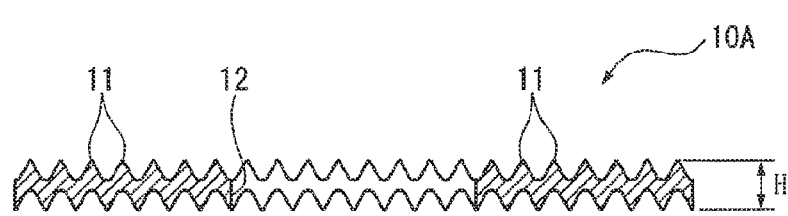

As with the friction-joining steel plate 10, the friction-joining steel plate 10A illustrated in FIG. 4(A) and FIG. 4(B) is provided on both faces with a plurality of projected streaks 11 which are generally in a thin plate shape and continuously formed mutually parallel but different from the friction-joining steel plate 10 in that the planar shape is a circle having a diameter which is about 2.5 times the shaft diameter ($\phi$) of the high strength bolt 2A around the shaft of the high strength bolt 2A (at the center of the insertion hole 12). The friction-joining steel plate 10A is similar in other detailed structures to the friction-joining steel plate 10.

Figure 5A:
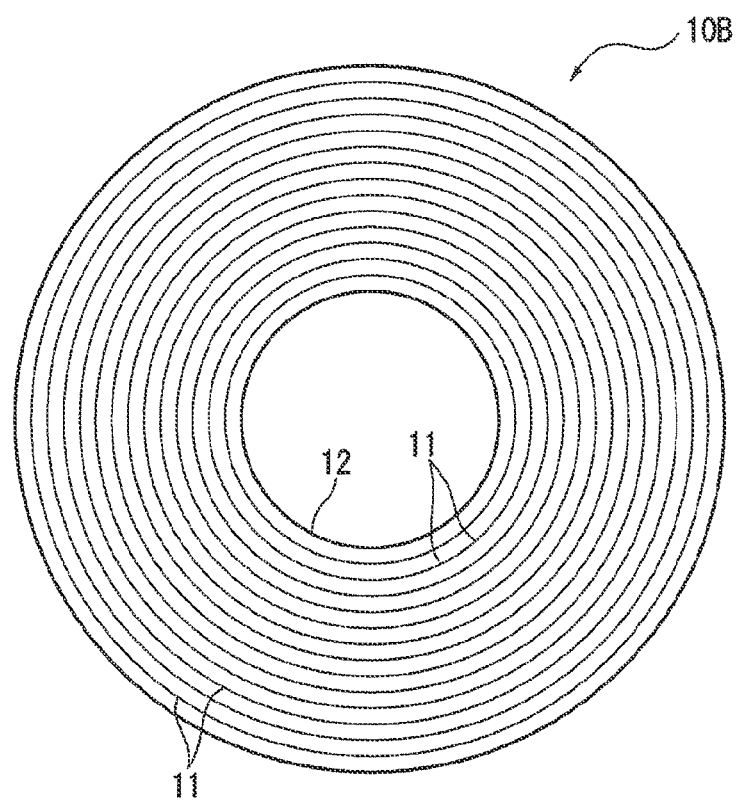
FIGS. 5(A) and (B) are respectively a front view and a sectional view showing a friction-joining steel plate of a modification example in the embodiment.
Figure 5B:
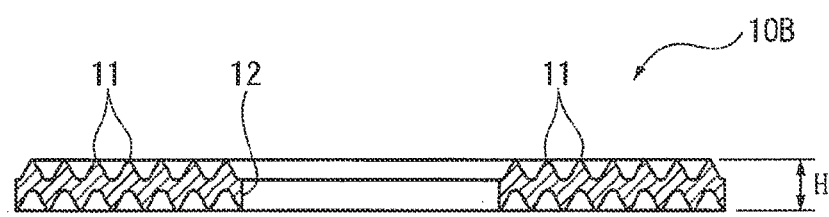
Figure 6:
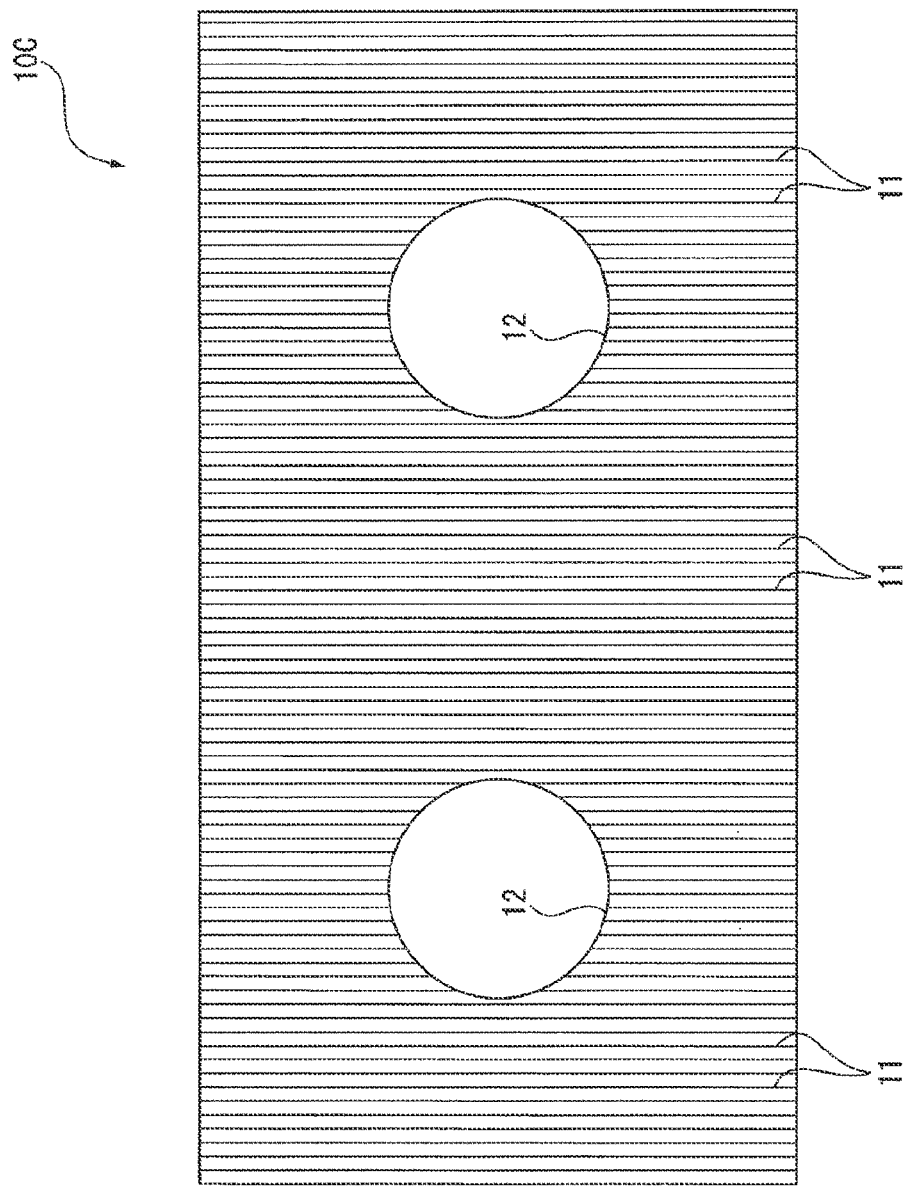
FIG. 6 is a front view showing a friction-joining steel plate of a modification example in the embodiment.

As with the friction-joining steel plate 10A, the friction-joining steel plate 10B illustrated in FIG. 5(A) and FIG. 5(B) is generally formed in a thin plate shape, the planar shape of which is a circle having a diameter which is about 2.5 times the shaft diameter ($\phi$) of the high strength bolt 2A around the shaft of the high strength bolt 2A (at the center of the insertion hole 12), and different from the friction-joining steel plates 10 and 10A in that it is provided on both surfaces with a plurality of projected streaks 11 continuously formed mutually in a concentric manner. The friction-joining steel plate 10B is similar in other detailed structures to the friction-joining steel plates 10 and 10A. According to the above-described friction-joining steel plate 10B, the projected streaks 11 are formed in a concentric manner, thereby, a frictional resistance can be exhibited in any desired radial direction, which is preferably applicable to a case where a tensile force acts on the steel plates 1A and 1B in two or more directions. Further, the same degree of frictional resistance can be obtained, even if the friction-joining steel plate 10B is rotationally moved to some extent, thereby eliminating the necessity for tacking temporarily the friction-joining steel plate 10B on tightening the high strength bolts 2A, which is expected to result in an operational improvement.

As with the friction-joining steel plate 10, the friction-joining steel plate 10C illustrated in FIG. 6 is provided on both faces with a plurality of projected streaks 11 which are generally in a thin plate shape and formed continuously mutually parallel, and different from the friction-joining steel plate 10 in that it is provided with two insertion holes 12 and generally formed in a rectangular shape. Then, the friction-joining steel plate 10C is formed so as to provide at the side of each of these insertion holes 12 an end distance portion and an edge distance portion large enough to include the diameter which is about 2.5 times the shaft diameter of the shaft diameter ($\phi$) of the high strength bolts 2A around the shaft of the high strength bolts 2A (at the center of the insertion hole 12). The friction-joining steel plate 10C is similar in other detailed structures to the friction-joining steel plate 10. According to the above-described friction-joining steel plate 10C, the insertion holes 12 are formed in a plurality, thereby, a co-rotation in which the friction-joining steel plate 10C will rotate together on tightening the high strength bolt 2A can be prevented to eliminate the necessity for tacking temporarily the friction-joining steel plate 10C. It is, therefore, expected to result in an operational improvement.

Further, it is preferable in the friction-joining steel plate 10C that a recess between the projected streaks 11 at an intermediate position between the two insertion holes 12 be made deeper than a recess at other positions. By this, the friction-joining steel plate 10C can be made so as to be broken into two divisions at a position of a recess which is made deeper according to need, and even where a pitch of the bolt hole of the steel plates 1A and 1B does not coincide with a pitch of the insertion holes 12 of the friction-joining steel plate 10C, the divided friction-joining steel plate 10C can be arranged so as to coincide with the bolt hole.

Figure 7:
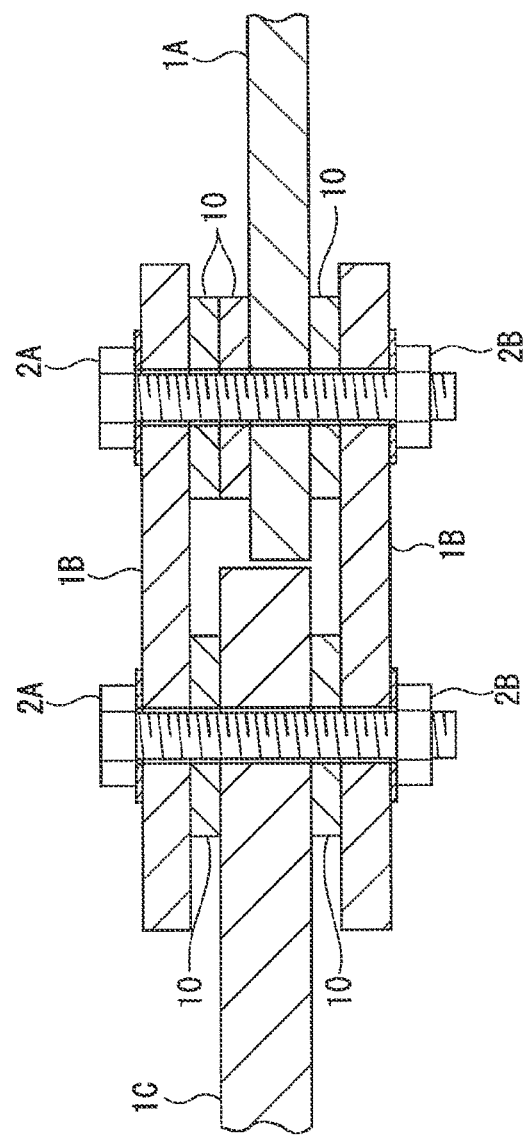
FIG. 7 is a sectional view showing a friction-joining structure of a modification example in the embodiment.

Further, the friction-joining structure of the present embodiment may include not only a structure in which, as illustrated in FIG. 1, the friction-joining steel plate 10 is inserted by one sheet each between the steel plates 1A and 1B but also a structure in which, as illustrated in FIG. 7, a plurality of friction-joining steel plates 10 are superimposed and inserted therebetween.

FIG. 7 is a sectional view illustrating a modification example of the friction-joining structure in the present embodiment.

The friction-joining structure illustrated in FIG. 7 is such that a lateral pair of the steel plates 1A and 1C, that is, steel products to be joined, are held between a vertical pair of the steel plates 1B, that is, steel products to be joined, via the friction-joining steel plate 10, thereby, the pair of the vertical steel plates 1B are joined by tightening the high strength bolts 2A and nuts 2B. Here, the steel plate 1A and the steel plate 1C are different from each other in the thickness dimension, or the steel plate 1A is thinner than the steel plate 1C. Two friction-joining steel plates 10 are superimposed and inserted between the steel plate 1A and the upper steel plate 1B. These two friction-joining steel plates 10 are superimposed in a state such that their projected streaks 11 are mated to each other, and constituted so that the friction-joining steel plates 10 are not deviated from each other.

Here, as illustrated in FIG. 7, the friction-joining structure in which a plurality of friction-joining steel plates 10 are superimposed and inserted therebetween includes not only a structure in which the steel plates 1A and 1C are different in thickness but also a case where a lateral pair of section steel (for example, H—section steel) is different in height dimension, for example, one of the section steel is a rolled H-section steel, while the other is a built H-section steel. In other words, an appropriate number of friction-joining steel plates 10 may be superimposed according to a difference in height dimension and inserted respectively between an exterior of the steel plate 1A which is a flange of section steel small in height dimension and the steel plate 1B which is a splice plate, and between the interior of the steel plate 1C which is a flange of section steel large in height dimension and the steel plate 1B which is a splice plate.

The above-constitution of the present embodiment is able to provide the following effects.

(1) Since a portion of the projected streaks 11 on the friction-joining steel plate 10 is provided with the Vickers hardness at least three times higher than the surface of steel plates 1A and 1B, the projected streaks 11 can enter more easily into the steel plates 1A and 1B, and a frictional resistance resulting from mechanical slip resistance of the thus entered projected streaks 11 acts between the steel plates 1A and 1B, thereby making it possible to increase remarkably a friction coefficient between the steel plates 1A and 1B through the friction-joining steel plate 10. As a result, a friction-joining structure is constituted by a slip resistance mechanism which can be easily validated from a theoretical or an experimental point of view and is also small in variance of the friction coefficient. It is, therefore, possible to set a friction coefficient in design to be highly accurate and of high value, for example, a friction coefficient of 0.9 or higher (preferably 1.0 or higher) and also realize a rational design.

(2) Then, the friction coefficient can be set higher to reduce the number of high strength bolts 2A and nuts 2B or to miniaturize the diameter thereof, thus making it possible to suppress the partial loss of area of the steel plates 1A and 1B to a minimum extent. Further, the steel plate 1A (or the steel plate 1B) used as a splice plate and the like can be made smaller in size, thus, making it possible to reduce the quantity of steel products and also reduce the material/construction costs necessary for architectural structures and civil engineering construction.

(3) Further, the necessity for applying conventional shot blasting or sanding to the surface of the steel plates 1A and 1B is eliminated, or for removing black scale or generating red rust, thus making it possible to process the steel plates 1A and 1B at a reduction in labor and time and also to drastically reduce the production cost. Still further, since the necessity for processing a large number of steel plates 1A and 1B which are available in a wide variety is also eliminated, a common friction-joining steel plate 10 is used in these steel plates 1A and 1B. It is, therefore, possible to mass-produce the friction-joining steel plate 10 and also to reduce the production/construction costs more effectively.

(4) Further, since forms of the projected streaks 11 on the friction-joining steel plate 10 (tip angle θ, space S between the projected streaks 11, radius of the tip end portion $R_1$, radius of recess $R_2$) are appropriately established, the projected streaks 11 are provided with an acute angle which can easily enter into the surface of the steel plates 1A and 1B. Further, the mechanical slip resistance is allowed to be exhibited to a sufficient extent, while a portion of the projected streaks 11 is secured for the shearing strength. Still further, since a distance H between the tip ends of the projected streaks 11, or a thickness dimension of the friction-joining steel plate 10, is set to be about 2.0 mm, a compressive force N derived from the high strength bolts 2A is used to bend the friction-joining steel plate 10, which can then be firmly attached to the surface of the steel plates 1A and 1B. Thus, all the projected streaks 11 on the friction-joining steel plate 10 are allowed to enter accurately into the steel plates 1A and 1B, thus making it possible to obtain a high friction coefficient.

(5) Still further, since a width dimension B of a part at which the projected streaks 11 enter into the surface of the steel plates 1A and 1B is set appropriately, an extent to which the projected streaks 11 enter is secured to increase a friction coefficient, while a width dimension of a part at which the projected streaks 11 do not enter into the surface of the steel plates 1A and 1B is secured to prevent the steel plates 1A and 1B from being deformed or broken due to shearing, thus making it possible to exhibit a frictional resistance in a stable manner. Further, since a compressive stress σ acting on the steel plates 1A and 1B is set so as to be less than half a tensile strength Grab, it is possible to secure the shearing strength and the turn-over strength of the steel plates 1A and 1B and also exhibit the mechanical slip resistance to a sufficient extent.

(6) In addition, even if black scale is formed or rust preventive paint is applied to the surface of the steel plates 1A and 1B, the projected streaks 11 on the friction-joining steel plate 10 are allowed to enter through penetration of the black scale or the rust preventive paint, thus making it possible to provide a stable friction coefficient, irrespective of the surface state of the steel plates 1A and 1B. Also eliminated is the necessity for not only removing the black scale or the rust preventive paint but also providing touch-up painting for rust prevention after joining, which also contributes to a reduction in labor and time related to construction work.

It is to be understood that the present invention is not limited to above embodiment but includes any other constitutions and the like which can attain an object of the present invention such as the following modification example.

In the above embodiment, a structure is exemplified such that a plurality of projected streaks 11 are formed continuously in one direction in parallel or continuously formed in a concentric manner as the friction-joining steel plates 10, 10A, 10B and 10C. However, the friction-joining steel plates may be provided with a plurality of projected streaks which are mutually parallel or may be formed with a plurality of combinations of these parallel projected streaks directed in two ways or in multiple ways. Further, in above embodiment, a structure is also exemplified such that one or two insertion holes 12 are formed as the friction-joining steel plates 10, 10A, 10B and 10C. However, the friction-joining steel plates may be provided with three or more insertion holes.

The best constitution for carrying out the present invention and the method thereof have been disclosed in the description so far made. However, the present invention is not limited thereto. In other words, although the present invention has been illustrated for a specific embodiment in particular and also explained, it is obvious to those skilled in the art that the above-described embodiment may be modified in various ways in terms of the shape, materials, quantities and other details without departing from the technical idea of the present invention and the scope of the claims.

Therefore, the above description specified for the shape and materials is made only for facilitating the understanding of the present invention by referring to examples and should be understood to not limit the present invention. Thus, any description of members not specifying a part or a whole of the shape or materials shall be included in the present invention.

EXAMPLES

Hereinafter, a description will be made of an example experimentally verified for the friction-joining structure of the embodiment.

In the following embodiment, a tensile strength test is conducted in which the friction-joining steel plate 10 and the steel plates 1A and 1B are fastened by using high strength bolts 2A and nuts 2B as illustrated in FIG. 1.

In this instance, the Vickers hardness ratio ($r_h$) is given as a first parameter, the tip angle ($\theta$) of the projected streaks 11 is given as a second parameter, and the stress intensity ratio ($\sigma/\sigma_{mb}$) is given as a third parameter. Then, the tensile strength test is conducted by allowing the three parameters to change, and the thus obtained friction coefficient (slip coefficient) $\mu_F$ is measured (First Parameter: Vickers Hardness Ratio $r_h$)

The Vickers hardness ratio $r_h$ is a ratio ($r_h = H_{vh}/H_{vm}$) of the Vickers hardness ($H_{vh}$) at a portion of the projected streaks 11 on the friction-joining steel plate 10 to the Vickers hardness ($H_{vm}$) on the surface of the steel plates 1A and 1B, and is set to 6 values, that is, approximately 1.7, 1.9, 2.6, 3.2, 4.0, and 4.3.

(Second Parameter: Tip Angle $\theta$ of Projected Streaks)

The tip angle $\theta$ of the projected streaks 11 is set in a range from 30° to 120°.

(Third Parameter: Stress Intensity Ratio $\sigma/\sigma_{mb}$)

The stress intensity ratio $\sigma/\sigma_{mb}$ is a ratio of the compressive stress ($\sigma$) acting on the steel plates 1A and 1B due to a compressive force (N) derived from the high strength bolts 2A to the tensile strength ($\sigma_{mb}$) of the steel plates 1A and 1B, and is set to 6 values, that is, approximately 0.2, 0.4, 0.5, 0.6, 0.8 and 1.0.

In this instance, the compressive stress ($\sigma$) acting on the steel plates 1A and 1B means a stress intensity $\sigma = N/(L \cdot B)$ obtained by dividing a compressive force (N) of the high strength bolts 2A by a total length dimension ($L = \Sigma A$) of the projected streaks 11 on the friction-joining steel plate 10 and a width dimension (B) of a part at which the projected streaks 11 enter thereinto. Further, in the measurement results given below, the following plot symbols are to be used, that is, 0.2 is indicated by white triangles ($\Delta$); 0.4 is indicated by white squares ($\square$); 0.5 is indicated by white circles ($\circ$); 0.6 is indicated by black triangles ($\blacktriangle$); 0.8 is indicated by black squares ($\blacksquare$) and 1.0 is indicated by black circles ($\bullet$) for every stress intensity ratio $\sigma/\sigma_{mb}$.

(Measurement results)

Figure 8A:
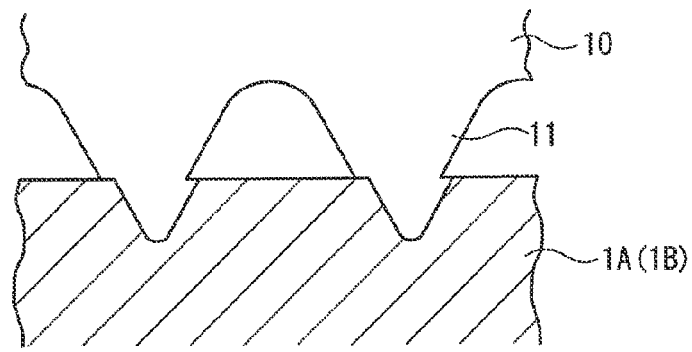
FIG. 8(A), (B) and (C) are sectional views showing a fracture mode of a friction-joining structure of an embodiment in the present invention.
Figure 9:
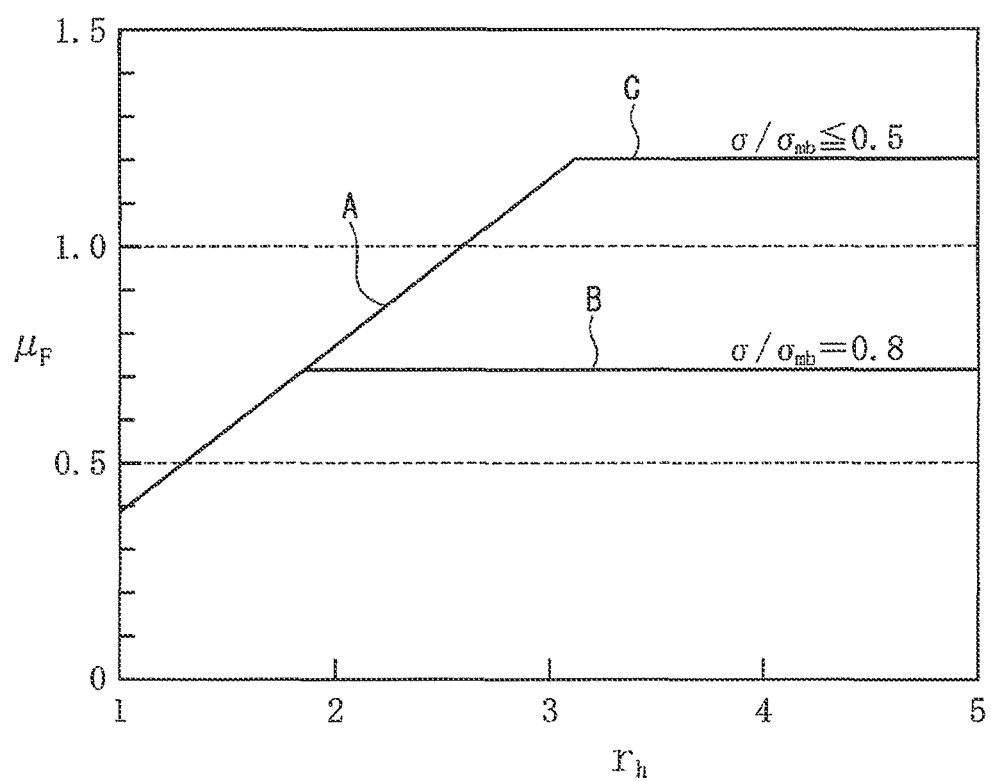
FIG. 9 is a graph showing a trend of friction coefficients for each of the fracture modes in the embodiment.

First, three fracture modes are confirmed depending on the value of each of the parameters. A certain tendency is found for a value of friction coefficient $\mu_F$ obtained for each of the fracture modes. FIG. 8(A), (B) and (C) show the thus confirmed three fracture modes, and FIG. 9 shows a tendency of values of the friction coefficient $\mu_F$ in each of the fracture modes. In FIG. 9, an approximate straight-line is used to indicate a lower limit of the friction coefficient $\mu_F$ in each of the fracture modes (A to C), with the lateral axis (X-axis) given as the Vickers hardness ratio $r_h$ and the longitudinal axis (Y-axis) given as the friction coefficient $\mu_F$.

FIG. 8(A) shows a fracture mode (fracture mode A) in which the projected streaks 11 on the friction-joining steel plate 10 undergo shear fracture at a part at which the projected streaks enter thereinto. As given by symbol A in FIG. 9, a friction coefficient $\mu_F$ obtained according to the elevation of the Vickers hardness ratio $r_h$ tends to increase. This fracture mode A is confirmed markedly where the Vickers hardness ratio $r_h$ is about 3 or less.

Figure 8B:
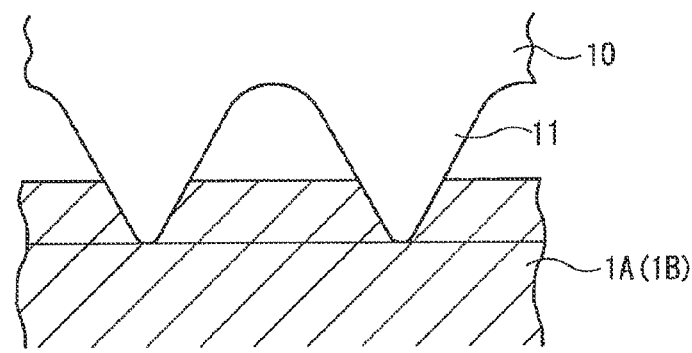

FIG. 8(B) shows a fracture mode (fracture mode B) in which the steel plates 1A and 1B undergo shear fracture at the tip end of the projected streaks 11. As given by symbol B in FIG. 9, an obtained friction coefficient $\mu_F$ tends to be constant and low, irrespective of the Vickers hardness ratio $r_h$. This fracture mode B is confirmed markedly where the stress intensity ratio $\sigma/\sigma_{mb}$ is about 0.8 or higher.

Figure 8C:
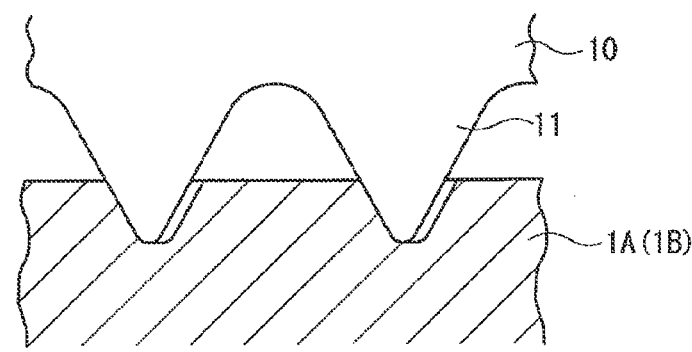

FIG. 8(C) shows a fracture mode (fracture mode C) at a part at which the steel plates 1A and 1B are turned over by the projected streaks 11. As given by symbol C in FIG. 9, an obtained friction coefficient $\mu_F$ tends to be constant and high, irrespective of the Vickers hardness ratio $r_h$. This fracture mode C is confirmed markedly where the Vickers hardness ratio $r_h$ is about 3 or higher and the stress intensity ratio $\sigma/\sigma_{mb}$ is about 0.5 or less.

Figure 10:
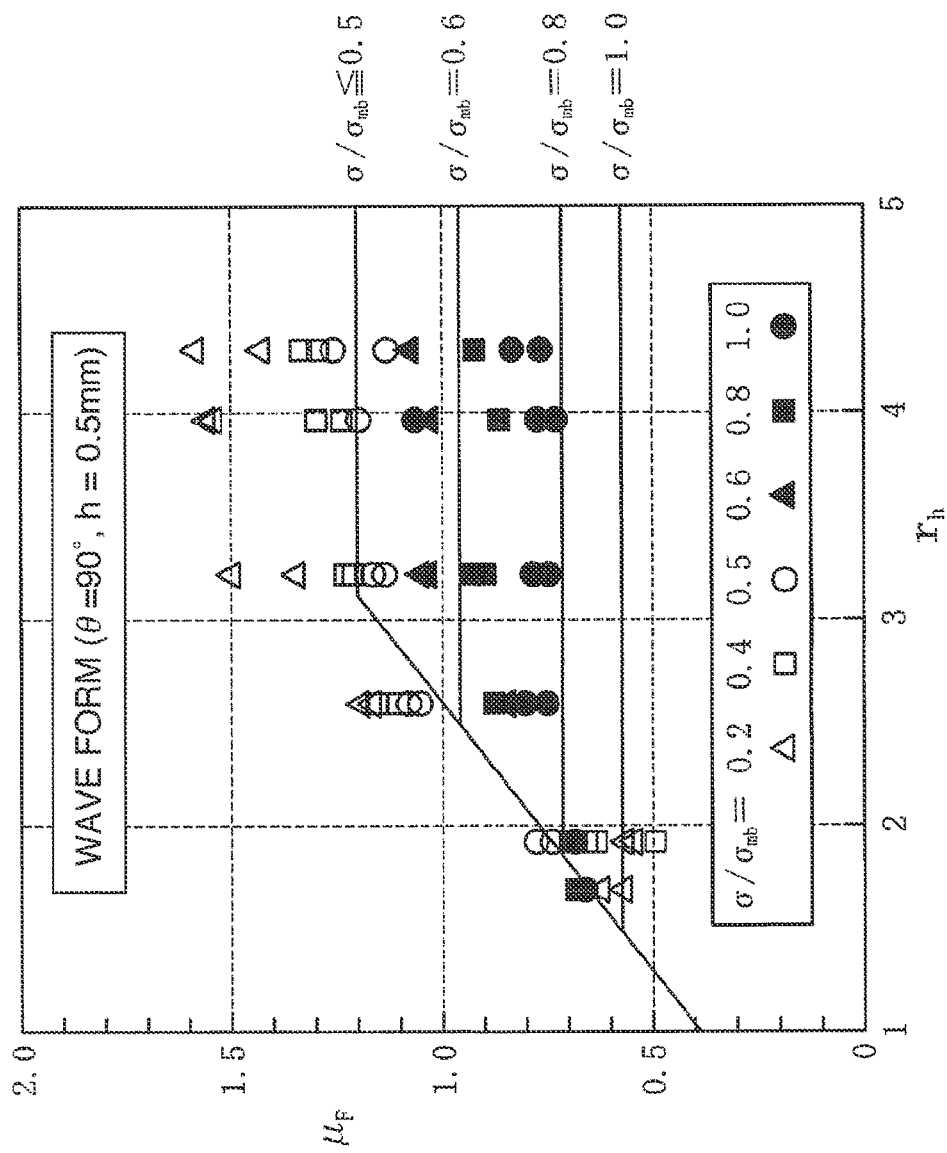
FIG. 10 is a graph showing a friction coefficient for each stress intensity ratio in the embodiment.

FIG. 10 shows the results covering each Vickers hardness ratio $r_h$ and each stress intensity ratio $\sigma/\sigma_{mb}$ where a tip angle $\theta$ of the projected streaks 11 is 90°.

FIG. 10 is a graph in which measurement results obtained for each stress intensity ratio $\sigma/\sigma_{mb}$ are plotted, with the lateral axis (X-axis) given as the Vickers hardness ratio $r_h$ and the longitudinal axis (Y-axis) given as the friction coefficient $\mu_F$, and an approximate straight-line is used to indicate a lower limit of the friction coefficient $\mu_F$ for each stress intensity ratio $\sigma/\sigma_{mb}$.

It is apparent from FIG. 10 that the friction coefficient $\mu_F$ exceeds 1.0, if the Vickers hardness ratio $r_h$ is 3 or more and the stress intensity ratio $\sigma/\sigma_{mb}$ is 0.5 or less. Further, it is apparent that the friction coefficient $\mu_F$ substantially exceeds 0.9, if the Vickers hardness ratio $r_h$ is 2.5 or more and the stress intensity ratio $\sigma/\sigma_{mb}$ is 0.6 or less. Still further, it is apparent that the friction coefficient $\mu_F$ substantially exceeds 0.7, if the Vickers hardness ratio $r_h$ is 2 or more and the stress intensity ratio $\sigma/\sigma_{mb}$ is 0.8 or less.

Figure 11:
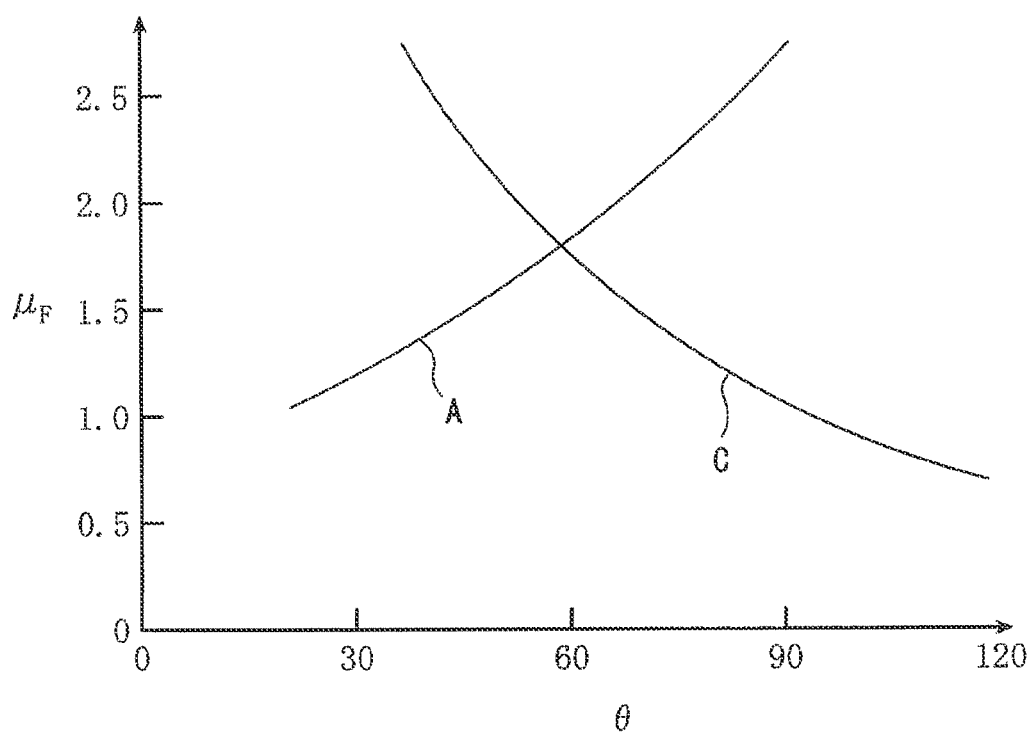
FIG. 11 is a graph showing a friction coefficient with respect to the tip angle of projected streaks in the embodiment.

FIG. 11 shows lower limits of the friction coefficient $\mu_F$ obtained from the tip angle θ of the projected streak 11 for each parameter.

FIG. 11 is a graph in which an approximate straight-line is used to indicate lower limits of the friction coefficient $\mu_F$, with the lateral axis (X-axis) given as a tip angle θ of the projected streaks 11 and the longitudinal axis (Y-axis) given as a friction coefficient $\mu_F$.

As given by symbol A in FIG. 11, an obtained friction coefficient $\mu_F$ tends to increase with an increase in tip angle θ for the fracture mode A. That is, it is apparent that the greater the tip angle θ of the projected streak 11 is, the less likely the projected streaks 11 undergo shear fracture, thereby resulting in an increased frictional resistance.

On the other hand, as given by symbol C in FIG. 11, in the case of the fracture mode C, an obtained friction coefficient $\mu_F$ tends to reduce with an increase in tip angle θ. That is, it is apparent that the greater the tip angle θ of the projected streaks 11 becomes and the higher the shearing strength of the projected streaks 11 becomes, the more likely a part at which the steel plates 1A and 1B enter is turned over, thereby resulting in a decreased frictional resistance.

It is, therefore, apparent that a tip angle θ at which a large friction coefficient $\mu_F$ ($\mu_F \geq 1.0$) is obtained both in the fracture modes A and C is from 50° to 100°. Meanwhile, where a frictional resistance is decided in accordance with the strength of the steel plates 1A and 1B, with the projected streaks 11 being prevented from shear fracture (fracture mode C), or where a friction coefficient $\mu_F$ 1.0 or more is obtained in a simple method for the sake of design, it is preferable that the tip angle θ of the projected streaks 11 be set in a range from 75° to 90°.

Figure 12:
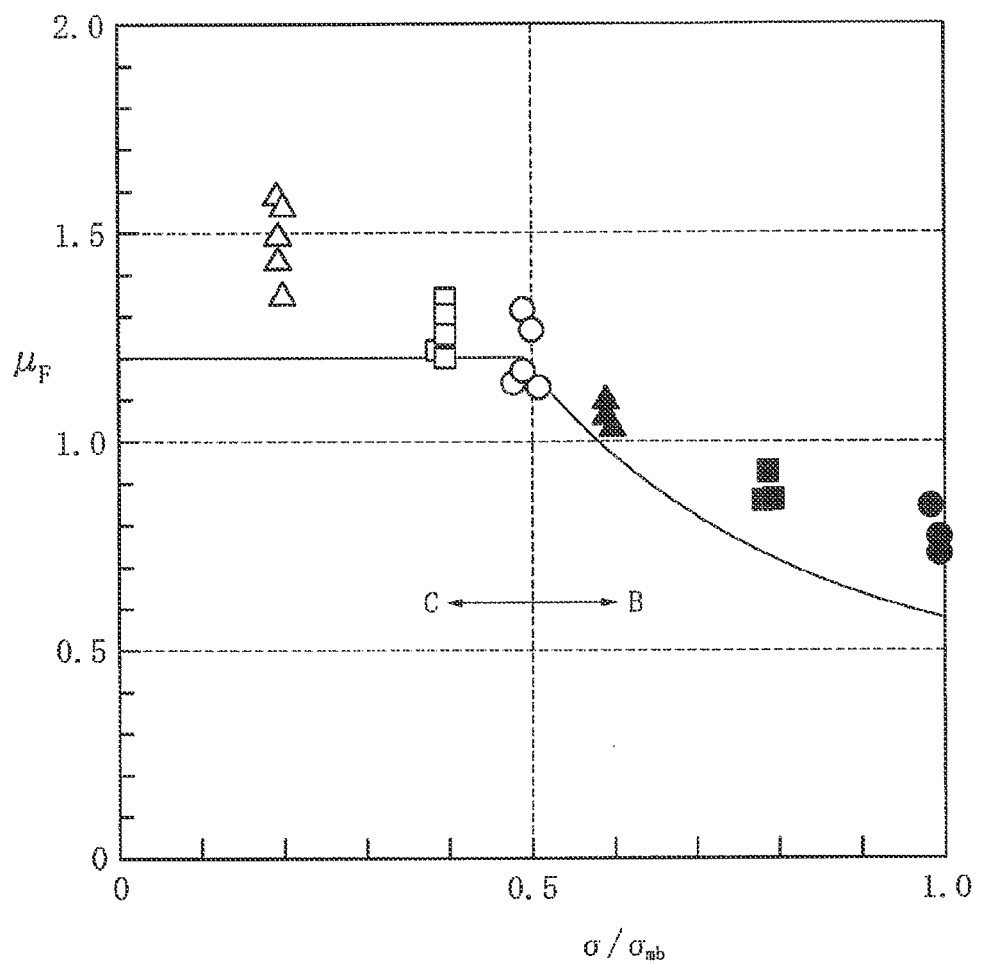
FIG. 12 is a graph showing a friction coefficient with respect to the stress intensity ratio in the embodiment.
Figure 13:
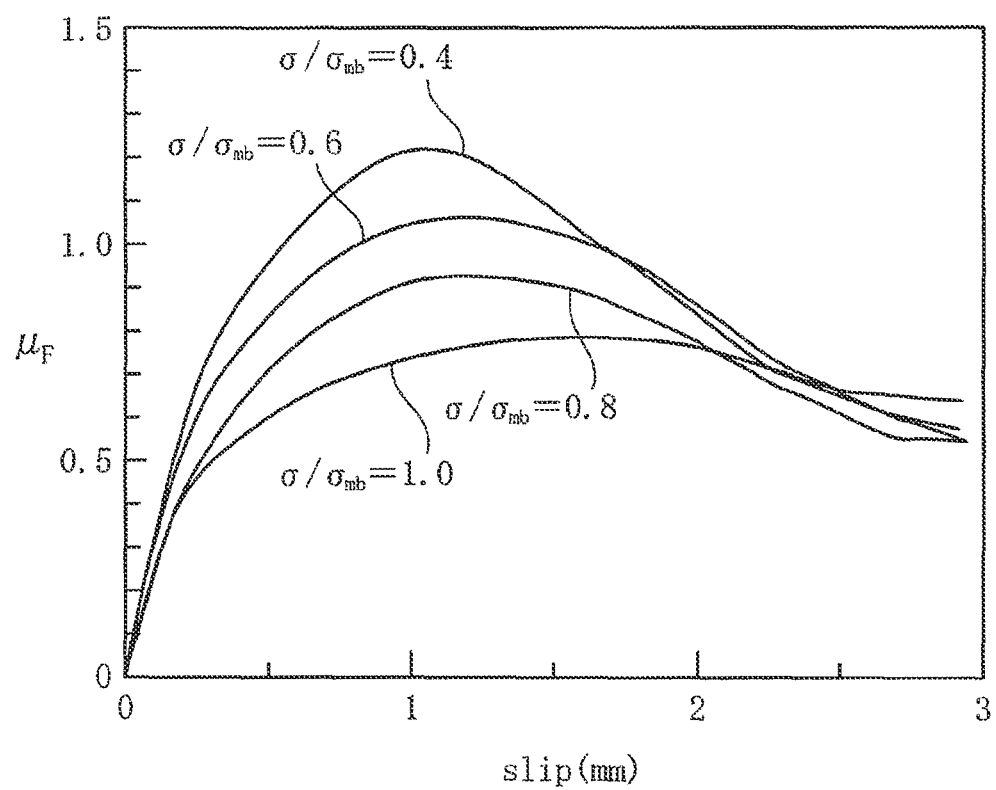
FIG. 13 is a graph showing a friction coefficient with respect to slippage at the time of the tensile strength test in the embodiment.

FIG. 12 is a graph in which obtained values of the friction coefficient $\mu_F$ are plotted, with the lateral axis (X-axis) given as a stress intensity ratio $\sigma/\sigma_{mb}$ and the longitudinal axis (Y-axis) given as a friction coefficient $\mu_F$, and an approximate straight-line is used to indicate lower limits. FIG. 13 is a graph in which an approximate straight-line is used to indicate measurement results for each stress intensity ratio $\sigma/\sigma_{mb}$, with the lateral axis (X-axis) given as a slippage at the time of the tensile strength test and the longitudinal axis (Y-axis) given as a friction coefficient $\mu_F$. Both FIG. 12 and FIG. 13 show the results obtained where the tip angle θ of the projected streaks 11 is 90° and the Vickers hardness ratio $r_h$ is 3 or more, and FIG. 13 shows a case where the Vickers hardness ratio $r_h$ is about 3.2.

It is apparent from FIG. 12 that the friction coefficient $\mu_F$ exceeds 1.0, if the stress intensity ratio $\sigma/\sigma_{mb}$ is 0.5 or less. It is also apparent that the friction coefficient $\mu_F$ is decreased as with an increase in the stress intensity ratio $\sigma/\sigma_{mb}$, if the stress intensity ratio $\sigma/\sigma_{mb}$ exceeds 0.5. That is, it is apparent that a range at which the stress intensity ratio $\sigma/\sigma_{mb}$ is 0.5 or less indicates the fracture mode C and a range at which the stress intensity ratio $\sigma/\sigma_{mb}$ exceeds 0.5 indicates the fracture mode B.

Further, as shown in FIG. 13, it is apparent that the friction coefficient $\mu_F$ indicates a high value of 1.0 or more and slippage is kept low or about 1 mm or less, if the stress intensity ratio $\sigma/\sigma_{mb}$ is 0.5 or less.

Therefore, it is apparent that the Vickers hardness $H_{vh}$ and tip angle θ of the projected streaks 11 on the friction-joining steel plate 10 are established depending on the Vickers hardness $H_{vm}$ and the tensile strength σ on the surface of the steel plates 1A and 1B (steel products to be joined) in such a manner that the Vickers hardness ratio $r_h$ is 3 or more, the tip angle θ of the projected streaks 11 is from 50° to 100° (more preferably from 75° to 90°) and the stress intensity ratio $\sigma/\sigma_{mb}$ is kept to be 0.5 or less (fracture mode C), thereby making it possible to obtain the friction coefficient $\mu_F$ of 1.0 or more.

Next, FIG. 14 to FIG. 21 show the results in which the friction-joining steel plate 10 and the steel plates 1A and 1B are kept tightened by using the high strength bolts 2A and nuts 2B to conduct the tensile strength test.

Figure 19:
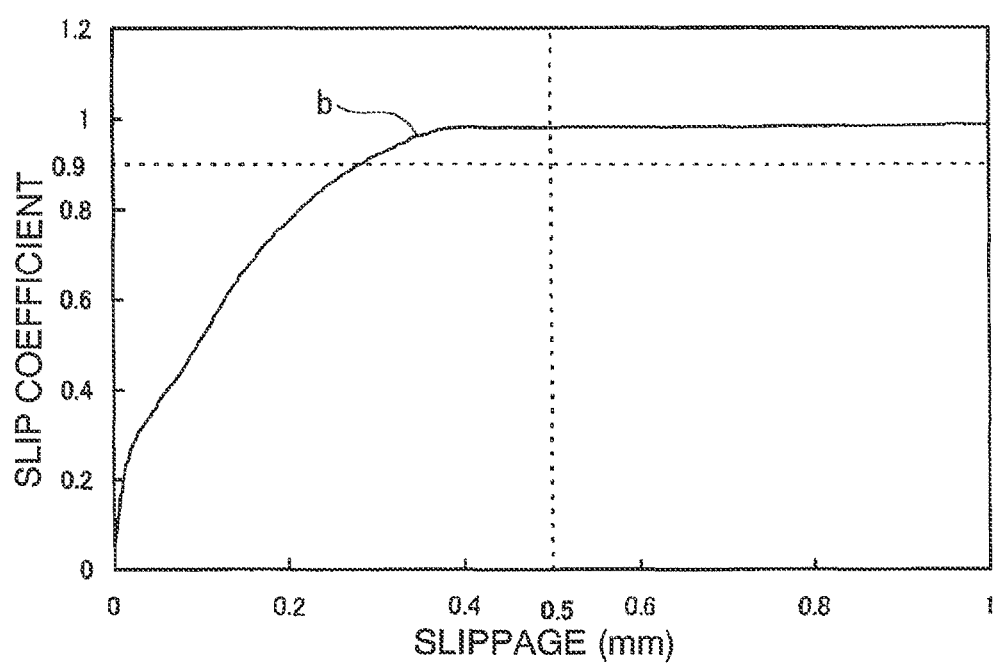
FIG. 19 is a graph showing the test results obtained by using the friction-joining steel plate of Embodiment 2.
Figure 20:
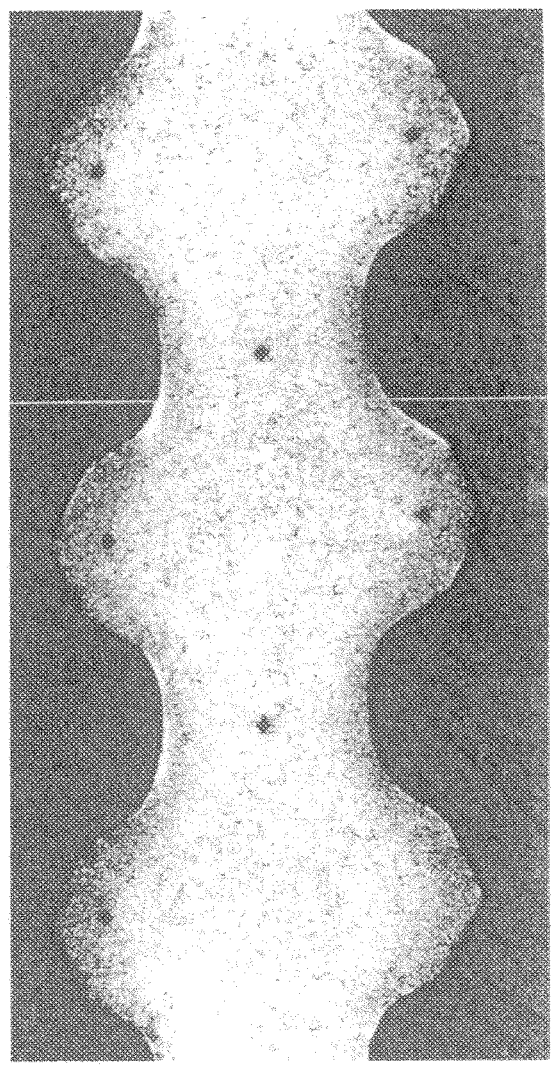
FIG. 20 is a photo showing a friction-joining steel plate of a comparative example in the present invention.
Figure 21:
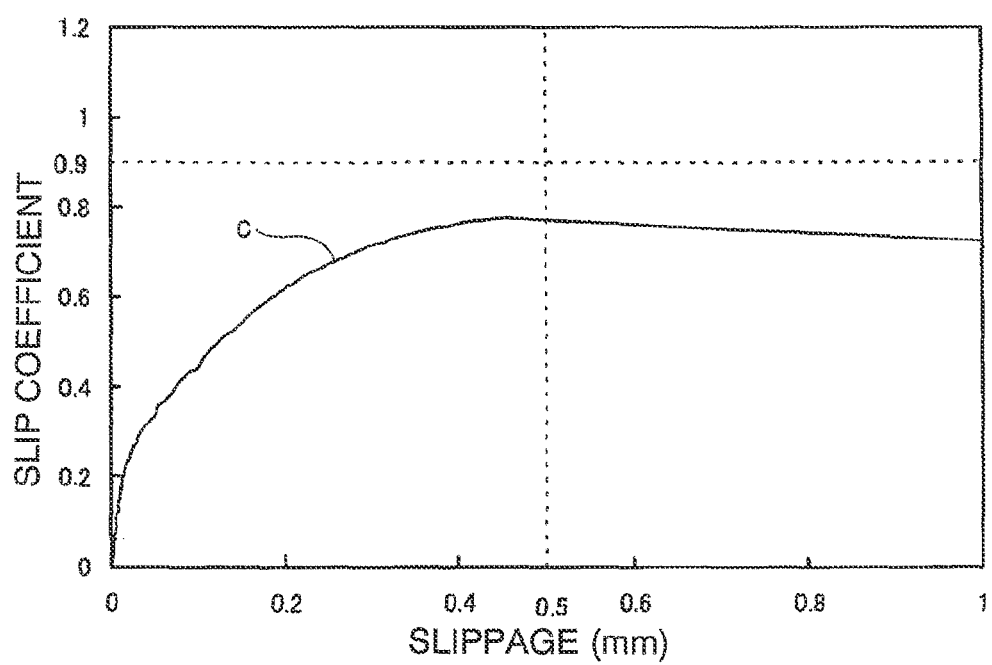
FIG. 21 is a graph showing the test results obtained by using the friction-joining steel plate of the comparative example.

Here, a description will be made for Embodiment 1 of the present invention (FIG. 14 to FIG. 16), Embodiment 2 (FIG. 17 to FIG. 19) and their comparative example (FIG. 20 and FIG. 21).

Figure 16:
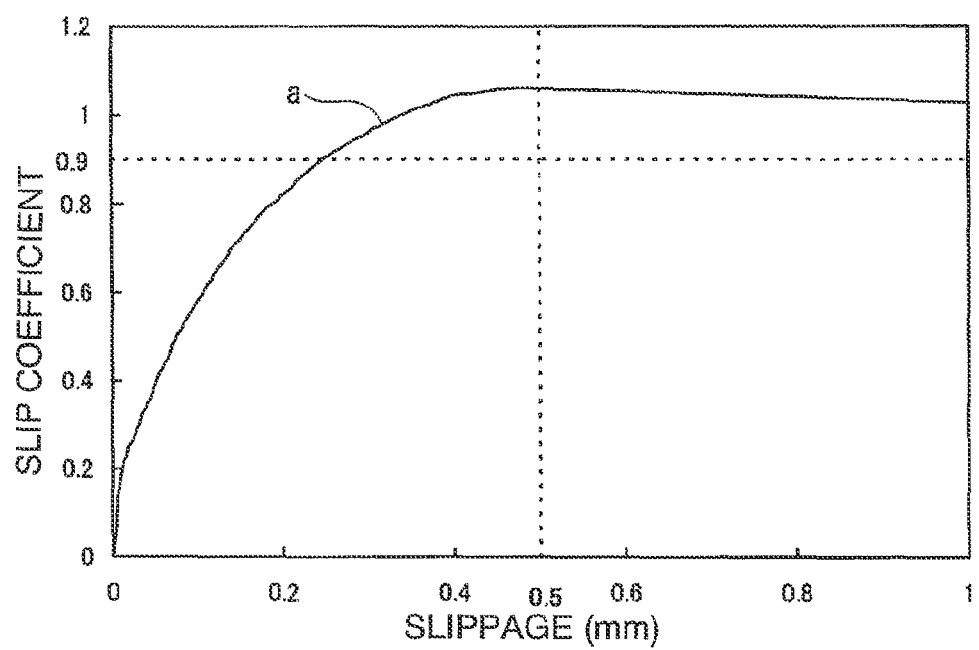
FIG. 16 is a graph showing the test results obtained by using the friction-joining steel plate of Embodiment 1.

Further, in each of the embodiments and comparative example, material characteristics (material strength and Vickers hardness) of the friction-joining steel plate 10 and manufacturing methods thereof as well as material characteristics of the steel plates 1A and 1B and surface treatments are made similar and a form of the projected streaks 11 on the friction-joining steel plate 10 is used as the only parameter to conduct the tensile strength test. Further, values obtained by dividing an introduced axial tension (compressive force N) tightened by the high strength bolts 2A and nuts 2B by a tensile force stretching the steel plates 1A and 1B toward a direction orthogonal to the compressive force N (slip coefficient, friction coefficient) and slippage to a direction at which the steel plates 1A and 1B are stretched at a position of the friction-joining steel plate 10 are graphically described, the test results of which are shown in FIG. 16, FIG. 19 and FIG. 21.

(Embodiment 1)

Figure 14:
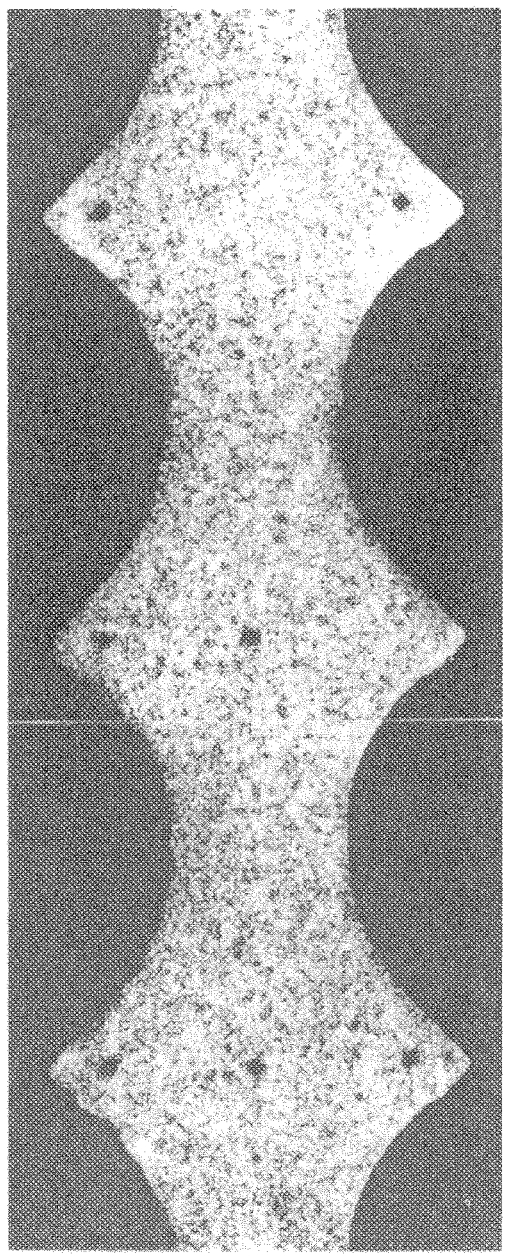
FIG. 14 is a photo showing a friction-joining steel plate of Embodiment 1 in the present invention.
Figure 15:
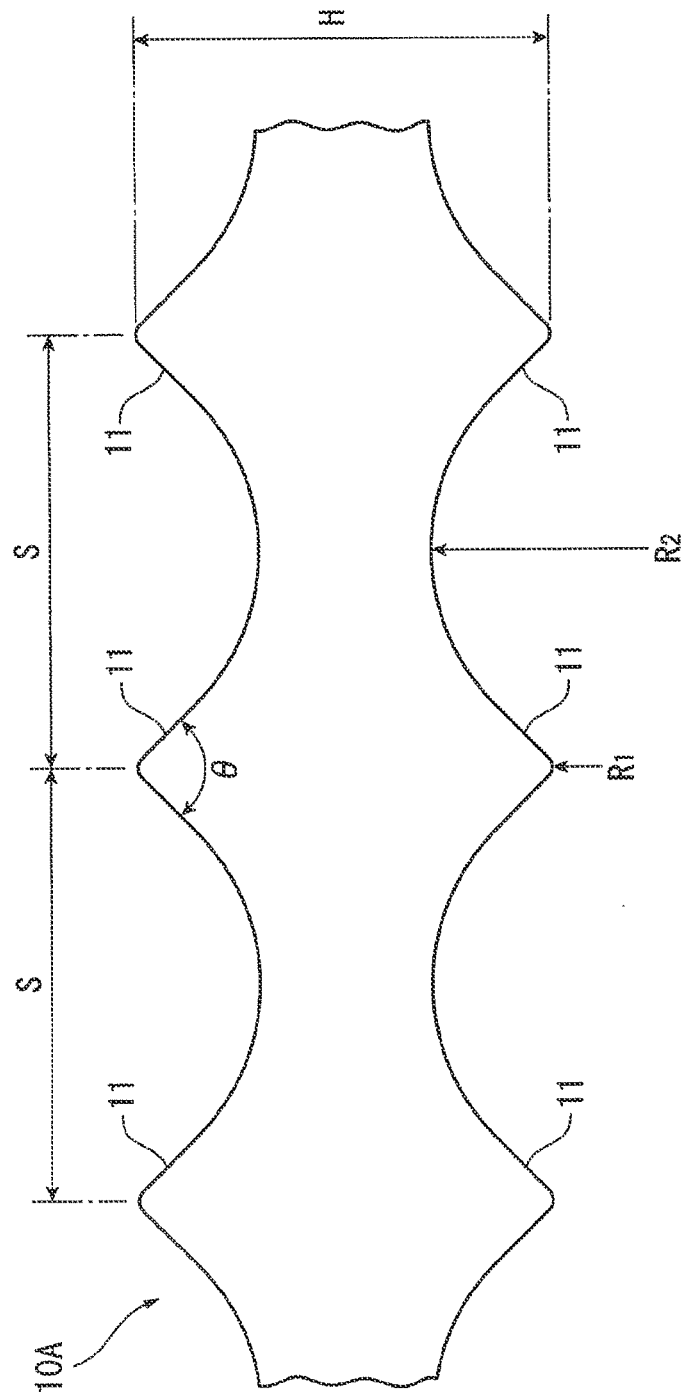
FIG. 15 is a sectional view showing the friction-joining steel plate of Embodiment 1.

FIG. 14 is a photo showing a friction-joining steel plate of Embodiment 1. FIG. 15 is a sectional view illustrating the friction-joining steel plate 10a of Embodiment 1. FIG. 16 is a graph illustrating the test results obtained by using the friction-joining steel plate 10a of Embodiment 1.

As illustrated in FIG. 15, the friction-joining steel plate 10A of Embodiment 1 is such that the projected streaks 11 are formed symmetrically on the front face and the back face, a space (S) between adjacent projected streaks 11 is set to be about 1.5 mm, and a distance (H) between the tip ends of the projected streaks 11 on the front face and the back face is set to be about 1.5 mm. Further, in the friction-joining steel plate 10a, a tip angle (θ) of the projected streaks 11 is set to be about 90° and a radius ($R_1$) of the tip end portion of the projected streaks 11 is set to be 0.1 mm or less (about 0.1 mm), and a radius ($R_2$) of a recess between the projected streaks 11 is set to be 0.4 mm or greater (about 1.0 mm).

According to the above-described friction-joining steel plate 10A of Embodiment 1, it is apparent from a load-deformation curve a in FIG. 16 that where slippage is 0.5 mm or less, a friction coefficient exceeds 1.0, and until the slippage exceeds 0.5 mm and arrives at 1.0 mm, the friction coefficient does not fall below 1.0, thereby providing favorable mechanical properties.

(Embodiment 2)

Figure 17:
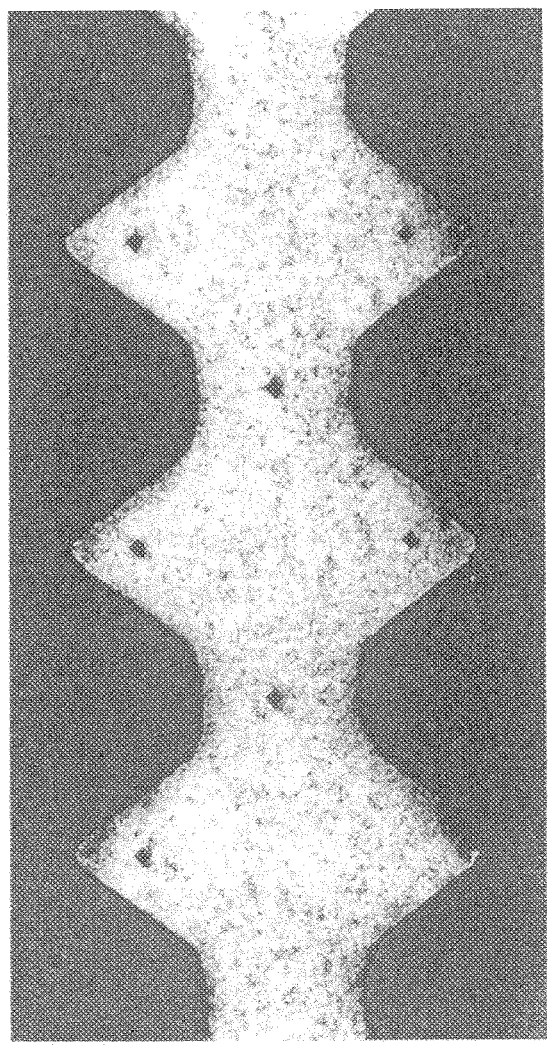
FIG. 17 is a photo showing a friction-joining steel plate of Embodiment 2 in the present invention.
Figure 18:
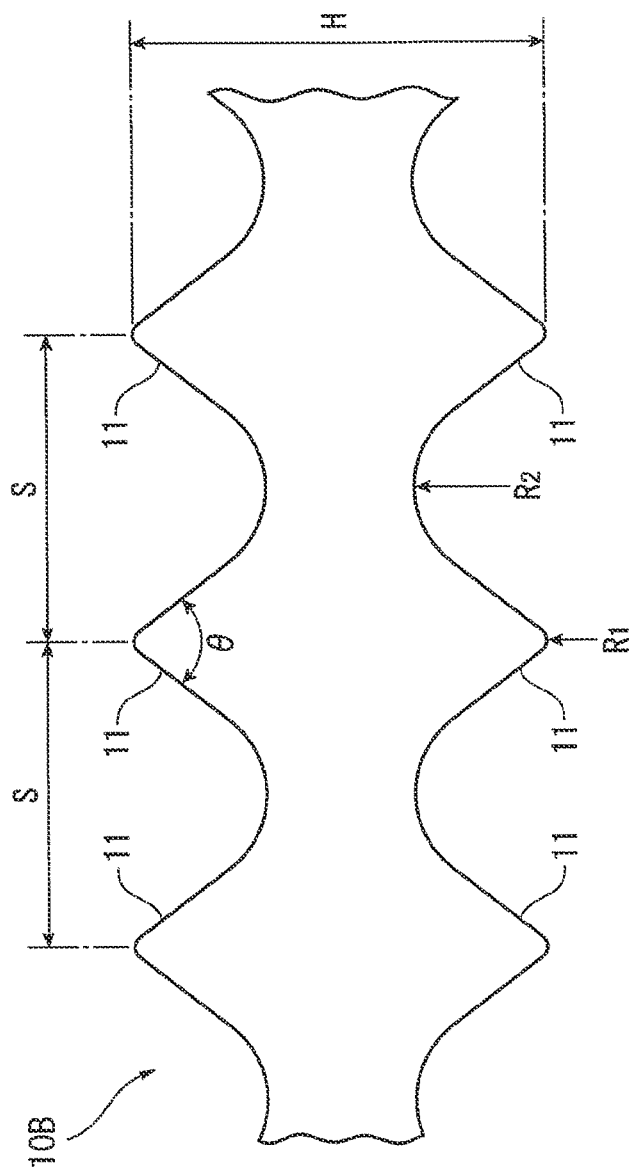
FIG. 18 is a sectional view showing the friction-joining steel plate of Embodiment 2.

FIG. 17 is a photo showing a friction-joining steel plate of Embodiment 2. FIG. 18 is a sectional view illustrating the friction-joining steel plate 10B of Embodiment 2. FIG. 19 is a graph illustrating the test results obtained by using the friction-joining steel plate 10B of Embodiment 2.

As illustrated in FIG. 18, the friction-joining steel plate 10B of Embodiment 2 is such that the projected streaks 11 are formed symmetrically on the front face and the back face, a space (S) between adjacent projected streaks 11 is set to be about 0.8 mm, and a distance (H) between the tip ends of the projected streaks 11 on the front face and the back face is set to be about 1.5 mm. Further, in the friction-joining steel plate 10b, a tip angle (θ) of the projected streaks 11 is set to be about 75° and a radius (R₁) of the tip end portion of the projected streaks 11 is set to be 0.1 mm or less (about 0.1 mm), and a radius (R₂) of a recess between the projected streaks 11 is set to be 0.4 mm or greater (about 0.4 mm).

According to the above-described friction-joining steel plate 10B of Embodiment 2, it is apparent from a load-deformation curve b in FIG. 19 that where slippage is 0.5 mm or less, a friction coefficient is substantially 1.0, and until the slippage exceeds 0.5 mm and arrives at 1.0 mm, the friction coefficient does not fall below 1.0, thereby providing favorable mechanical properties.

(Comparative Example)

FIG. 20 is a photo showing a friction-joining steel plate of a comparative example. FIG. 21 is a graph illustrating the test results obtained by using the friction-joining steel plate of the comparative example.

Approximate to the friction-joining steel plate 10A of Embodiment 1, in the friction-joining steel plate of the comparative example, a space (S) between adjacent projected streaks 11 is set to be about 1.5 mm, and a distance (H) between the tip ends of the projected streaks 11 on the front face and the back face is set to be about 1.5 mm. On the contrary, the friction-joining steel plate of the comparative example is different from the friction-joining steel plate 10a of Embodiment 1 in that a radius (R₁) of the tip end portions of the projected streaks 11 is set to be about 0.2 mm.

According to the above-described friction-joining steel plate of the comparative example, it is apparent from a load-deformation curve c in FIG. 21 that where slippage is 0.5 mm or less, a friction coefficient reaches a peak substantially at 0.75, and until the slippage exceeds 0.5 mm and arrives at 1.0 mm, the friction coefficient gradually decreases to about 0.7, thereby showing mechanical properties which are inferior to those of Embodiment 1 and Embodiment 2.

Figure 23:
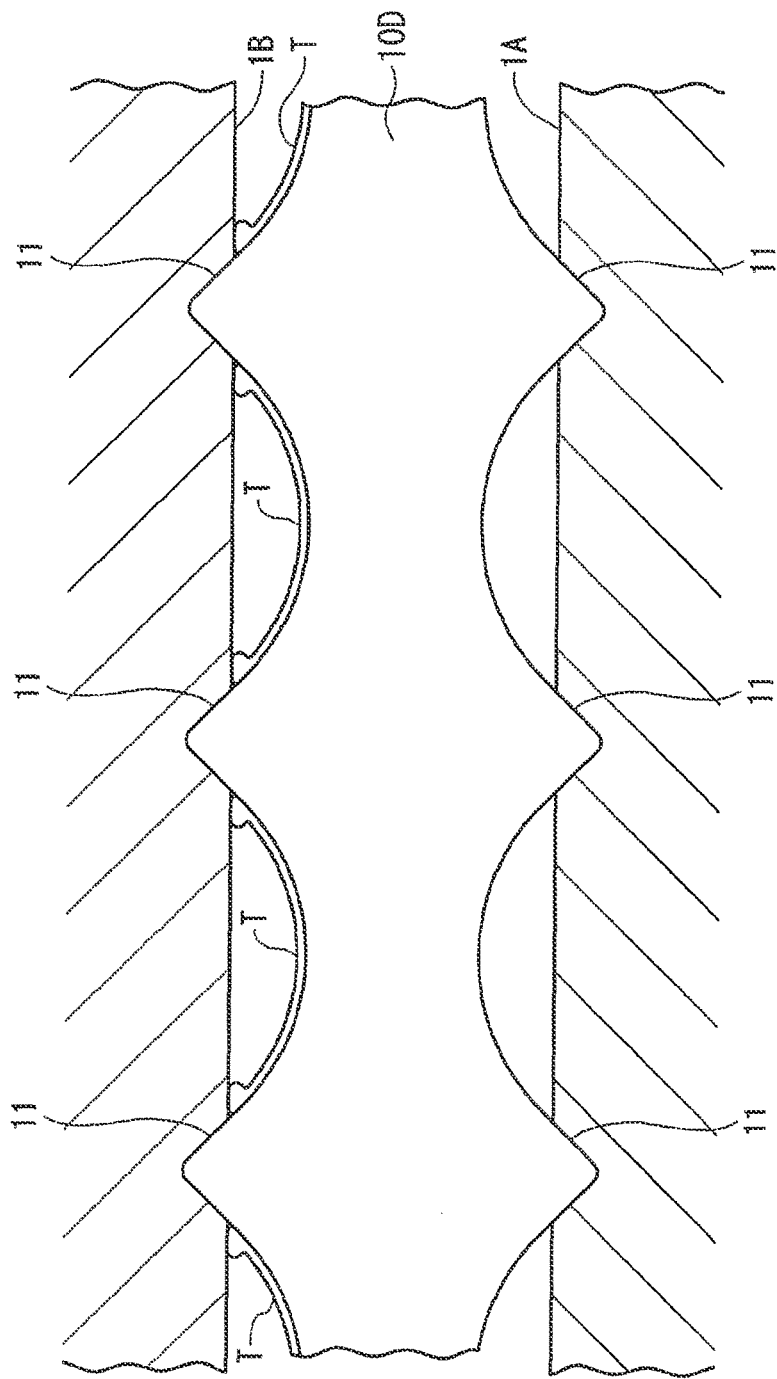
FIG. 23 is a sectional view showing a state after the friction-joining steel plate of Embodiment 3 is fastened.
Figure 24:
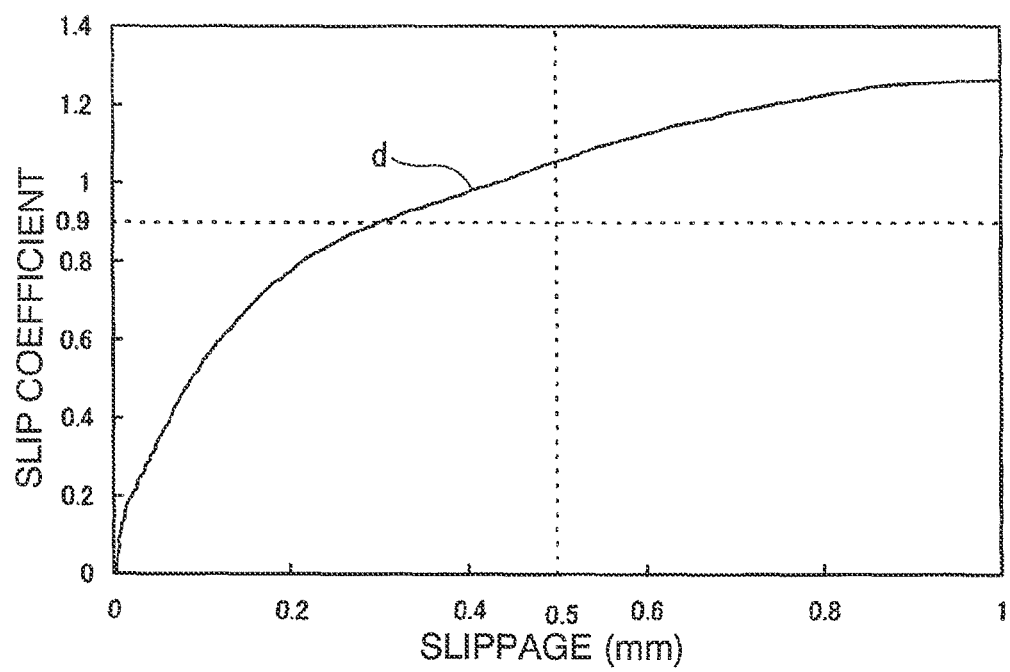
FIG. 24 is a graph showing the test results obtained by using the friction-joining steel plate of Embodiment 3.

Next, a description will be made by referring to FIG. 22 to FIG. 24 for Embodiment 3 in which a friction-joining steel plate 10D and steel plates 1A and 1B are used, and the friction-joining steel plate 10D is in advance tacked temporarily to one of the plates or the steel plate 1A by using aluminum tape T, the other plate or the steel plate 1B is superimposed on the friction-joining steel plate 10D and then fastened by tightening high strength bolts 2A and nuts 2B.

(Embodiment 3)

Figure 22:
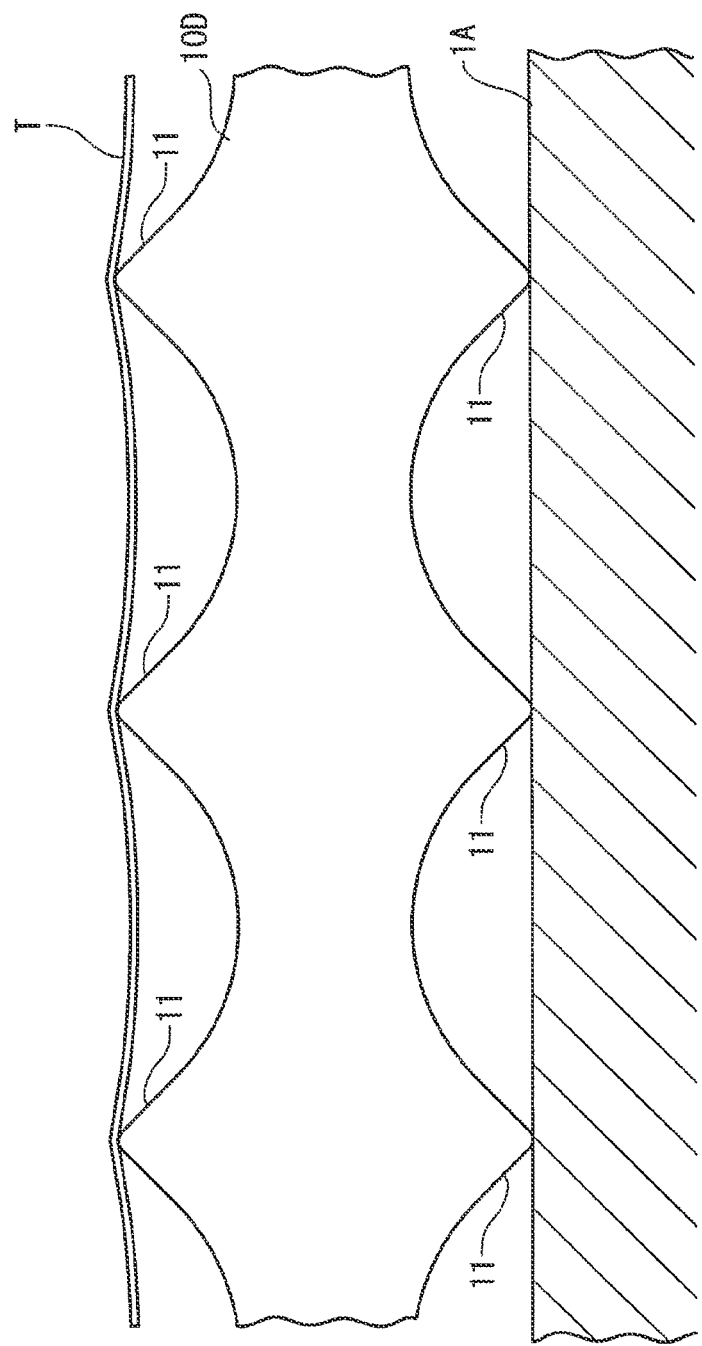
FIG. 22 is a sectional view showing a state in which a friction-joining steel plate of Embodiment 3 in the present invention is temporarily tacked.

FIG. 22 is a sectional view illustrating a state in which the friction-joining steel plate 10D of Embodiment 3 is tacked temporarily. FIG. 23 is a sectional view illustrating a state after the friction-joining steel plate 10D of Embodiment 3 is fastened. FIG. 24 is a graph illustrating the test results obtained by using the friction-joining steel plate 10D of Embodiment 3.

The friction-joining steel plate 10D of Embodiment 3 is formed so as to have a cross section which is approximately similar to that of the friction-joining steel plate 10A of Embodiment 1. As illustrated in FIG. 22, aluminum tape T is adhered to the projected streaks 11 so as to cover the friction-joining steel plate 10D, an end of which is also adhered to one of the plates or the steel plate 1A, thereby, the friction-joining steel plate 10D is temporarily tacked to the steel plate 1A. After the other plate or the steel plate 1B is superimposed on the aluminum tape T on the friction-joining steel plate 10D, the high strength bolts 2A and nuts 2B are tightened to allow a compressive force N to act thereon, by which, as shown in FIG. 23, the projected streaks 11 break the aluminum tape T to come out. The projected streaks 11 are to enter into the other plate or the steel plate 1B, while the projected streaks 11 on the opposite side are to enter into one of the plates or the steel plate 1A.

According to the above-described friction-joining steel plate 10D of Embodiment 3, it is apparent from a load-deformation curve d in FIG. 24 that where slippage is 0.5 mm or less, a friction coefficient exceeds 1.0, and until the slippage exceeds 0.5 mm and arrives at 1.0 mm, the friction coefficient does not fall below 1.0 but shows a gradual increase, thereby providing favorable mechanical properties.

Industrial Applicability

The present invention relates to a friction-joining steel plate inserted between steel products to be joined which are mutually friction-joined by a compressive force derived from a fastening device, the friction-joining steel plate being provided on both faces with a plurality of projected streaks continuously formed mutually parallel or mutually concentric and also provided with at least one insertion hole for allowing the fastening device to be inserted, wherein a portion of the projected streaks is designed to be higher in Vickers hardness than the surface of the steel products to be joined.

The friction-joining steel plate of the present invention is applicable to various friction joining portions at low cost and also able to reliably increase frictional resistance, thereby realizing a rational design.

The invention claimed is:

1. A friction joining structure comprising steel products, a friction-joining steel plate, and a fastening device, wherein said friction joining steel plate is inserted between said steel products which are mutually friction joined by a compressive force derived from said fastening device, the friction joining steel plate is provided on both faces with a plurality of projected streaks continuously formed in a mutually parallel or mutually concentric manner and also provided with at least one insertion hole for allowing the fastening device to be inserted, wherein the plurality of projected streaks is designed to be at least three times higher in Vickers hardness than a surface of the steel products, said surface being in contact with the projected streaks, a stress intensity ratio ($\sigma/\sigma_{mb}$) obtained by dividing a compressive stress ($\sigma$) acting on the steel products due to the compressive force of the fastening device by a tensile strength ($\sigma_{mb}$) of each of the steel products is set to be 0.5 or less, wherein the tensile strength ($\sigma_{mb}$) of each of the steel products is from 400 to 500 N/mm², and wherein the compressive stress ($\sigma$) is obtained by dividing a compressive force (N) of the fastening device by a total length dimension (L) of the projected streaks on one face of the friction joining steel plate and a width dimension (B) of a recess formed on the steel products by the projected streaks when the projected streaks enter the surface of the steel products, wherein the width dimension (B) at which the projected streaks enter into the surface of the steel products is set to be about ⅓ of a space (S) between the projected streaks.

2. A friction joining structure according to claim 1, wherein a tip angle (θ) of the projected streak is set in a range from 50° to 100°.

3. A friction joining structure according to claim 1, wherein a space (S) between the projected streaks is set in a range from 0.8 mm to 2.0 mm.

4. A friction joining structure according to claim 1, wherein a radius ($R_1$) of the tip end portion of the projected streak is set to be 0.1 mm or less.

5. A friction joining structure according to claim 1, wherein a radius ($R_2$) of a recess between the projected streaks is set to be 0.4 mm or greater.

6. A friction joining structure according to claim 1, wherein the friction joining steel plate is planar, has one insertion hole, and has a shape of a circle centering at the center of the insertion hole which is the same as a center axis of a shaft of the fastening device, and the diameter of friction joining steel plate is 2.5 times the shaft diameter of the fastening device.

7. A friction-joining structure according to claim 1, wherein a distance (H) between a tip end of the projected streak on one surface of the friction joining steel plate and a tip end of the projected streak on the other surface of the friction joining steel plate is set in a range from 1.5 mm to 2.5 mm.

8. A. friction joining structure according to claim 1, wherein the projected streaks are formed by a processing method selected from rolling, cutting and casting.

9. A friction-joining structure according to claim 1, wherein the friction joining steel plate is quenched after formation of the projected streaks.

10. A friction-joining structure according to claim 1, wherein the friction joining steel plate is tacked to one of the steel products using tack tape or applying rust preventive paint.

11. A friction-joining structure according to claim 10, wherein the tack tape is aluminum tape, wherein the aluminum tape is adhered to a face of one of the steel products so as to cover one face of the friction joining steel plate, and when the steel products are fastened using the fastening device such that the face of said one of the steel products to which the aluminum tape is adhered is kept in contact with a face of the other of the steel products, the projected streaks on the one face of the friction joining steel plate break the aluminum tape, thereby entering the face of said one of the steel products, and the projected streaks on the other face of the friction joining steel plate enter the face of the other of the steel products.

12. A friction-joining structure according to claim 1, wherein the friction joining steel plate has a plurality of insertion holes, each said hole for allowing a shaft of one of a plurality of fastening devices to pass through.

13. A friction-joining structure according to claim 1, wherein black scale or red rust is formed on the surface of the steel products, or abrasive blasting, sanding or rust preventive painting is applied thereto.

* * * * *

UNITED STATES PATENT AND TRADEMARK OFFICE
CERTIFICATE OF CORRECTION

PATENT NO. : 8,492,004 B2
APPLICATION NO. : 13/313646
DATED : July 23, 2013
INVENTOR(S) : Atsushi Watanabe et al.

Page 1 of 1

It is certified that error appears in the above-identified patent and that said Letters Patent is hereby corrected as shown below:

On the Title Page
(62) Related U.S. Application Data: change
"Division of application No. 12/226,178, filed as application No. PCT/JP2007/058228 on Apr. 10, 2008, now abandoned." to
-- Division of application No. 12/226,178, filed as application No. PCT/JP2007/058228 on Apr. 10, 2007, now abandoned. --;

(57) Abstract, line 1, change "friction joining" to -- friction-joining --;
(57) Abstract, line 2, change "friction joining" to -- friction-joining --;
(57) Abstract, line 3-4, change "friction joining" to -- friction-joining --;
(57) Abstract, line 5, change "friction joining" to -- friction-joining --;
(57) Abstract, line 10, change "friction joining" to -- friction-joining --;

In the Specification
Column 2, line 44, change "$r_h$ (= $H_{vh}/H_m$)" to -- $r_h$ (= $H_{vh}/H_{vm}$) --;
Column 9, line 41, change "$\sigma$ = N-(L•B)" to -- $\sigma$ = N/(L•B) --;
Column 12, line 58, change "Grab" to -- $\sigma_{mb}$ --;
Column 19, line 20, change "8.A. friction" to -- 8. A friction --.

Signed and Sealed this
Tenth Day of June, 2014

Michelle K. Lee
*Deputy Director of the United States Patent and Trademark Office*